(12) United States Patent
Yang et al.

(10) Patent No.: US 11,394,534 B2
(45) Date of Patent: Jul. 19, 2022

(54) ELECTRONIC DEVICE SHARING KEY WITH EXTERNAL ELECTRONIC DEVICE AND OPERATING METHOD FOR ELECTRONIC DEVICE

(71) Applicant: Samsung Electronics Co., Ltd., Gyeonggi-do (KR)

(72) Inventors: Yi Yang, Gyeonggi-do (KR); Jonghwan Kim, Gyeonggi-do (KR); Moonseok Kang, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/960,368

(22) PCT Filed: Mar. 14, 2019

(86) PCT No.: PCT/KR2019/002946
§ 371 (c)(1),
(2) Date: Jul. 7, 2020

(87) PCT Pub. No.: WO2019/194428
PCT Pub. Date: Oct. 10, 2019

(65) Prior Publication Data
US 2021/0194679 A1    Jun. 24, 2021

(30) Foreign Application Priority Data

Apr. 2, 2018  (KR) ........................ 10-2018-0038366

(51) Int. Cl.
*H04L 9/08*   (2006.01)
*H04L 9/32*   (2006.01)

(52) U.S. Cl.
CPC ............ *H04L 9/0825* (2013.01); *H04L 9/085* (2013.01); *H04L 9/0872* (2013.01); *H04L 9/3263* (2013.01)

(58) Field of Classification Search
CPC ..... H04L 9/0825; H04L 9/085; H04L 9/0872; H04L 9/3263; H04L 9/08; H04L 9/32; G06F 21/33
See application file for complete search history.

(56) References Cited

U.S. PATENT DOCUMENTS 9,428,127 B2    8/2016 Cooper et al.
11,042,816 B2 *  6/2021 Zaid ...................... H04W 12/08
(Continued)

FOREIGN PATENT DOCUMENTS

KR    10-2014-0098872 A    8/2014
KR    10-2015-0063198 A    6/2015
(Continued)

*Primary Examiner* — Techane Gergiso
(74) *Attorney, Agent, or Firm* — Cha & Reiter, LLC

(57) ABSTRACT

An electronic device according to an embodiment may include a processor, a wireless communication module, and a security module. The security module may store and manage a shared key and an authentication key. The processor may be configured to receive a request for transmission of the authentication key to a first external electronic device and transmit, to the security module, information and command for generation of the shared key. The security module may generate the shared key based on the information for generation of the shared key, and the security module may transmit, to the first external electronic device, the generated shared key and information associated with the generated shared key. Various other embodiments are possible.

14 Claims, 14 Drawing Sheets

(56) References Cited

U.S. PATENT DOCUMENTS

| | | | |
|---|---|---|---|
| 2014/0025950 A1* | 1/2014 | Peeters | H05B 47/14 |
| | | | 713/168 |
| 2014/0282877 A1* | 9/2014 | Mahaffey | H04W 12/08 |
| | | | 726/3 |
| 2015/0148989 A1* | 5/2015 | Cooper | H04L 67/306 |
| | | | 701/2 |
| 2015/0262441 A1 | 9/2015 | Kim et al. | |
| 2016/0019738 A1 | 1/2016 | Kim | |
| 2016/0344710 A1* | 11/2016 | Khan | H04L 63/061 |
| 2017/0050617 A1* | 2/2017 | Penilla | B60L 53/68 |
| 2017/0134382 A1* | 5/2017 | Darnell | H04W 12/041 |
| 2017/0289329 A1* | 10/2017 | Yim | G06F 3/048 |
| 2017/0352215 A1* | 12/2017 | Maiwand | G07C 9/00571 |
| 2018/0351941 A1* | 12/2018 | Chhabra | H04L 9/3234 |

FOREIGN PATENT DOCUMENTS

| | | |
|---|---|---|
| KR | 10-2015-0107591 A | 9/2015 |
| KR | 10-2016-0088880 A | 7/2016 |
| KR | 10-2017-0138031 A | 12/2017 |

* cited by examiner

ELECTRONIC DEVICE SHARING KEY WITH EXTERNAL ELECTRONIC DEVICE AND OPERATING METHOD FOR ELECTRONIC DEVICE

CROSS REFERENCE TO RELATED APPLICATIONS

This application is a National Phase Entry of PCT International Application No. PCT/KR2019/002946, which was filed on Mar. 14, 2019, and claims a priority to Korean Patent Application No. 10-2018-0038366, which was filed on Apr. 2, 2018, the contents of which are incorporated herein by reference.

TECHNICAL FIELD

Various embodiments of the disclosure relate to an electronic device sharing a key of an external electronic device and an operating method of an electronic device.

BACKGROUND ART

Technology related to a smart key capable of controlling external electronic devices such as door locks, vehicles, and the like through wireless communication is being developed. For example, in the case where the external electronic device is a vehicle, the development of technology related to a smart key capable of performing functions provided by a vehicle, such as unlocking a vehicle door, starting an engine of a vehicle, and the like is under way. The smart key is capable of performing an authentication procedure with a vehicle using short-range communication and activating functions of the vehicle, such as unlocking or starting thereof, after authentication is completed.

Recently, technology has been introduced to perform the functions provided by an external electronic device using a portable terminal such as a smartphone, a wearable device, or the like, which can be held by a user, instead of using a separate smart key for activating the functions of the external electronic device.

DISCLOSURE OF INVENTION

Technical Problem

An application for managing a key of an external electronic device may use an external electronic device key solution based on a security module separately provided in a portable terminal in order to provide security.

A user, other than the owner of the external electronic device, who wishes to use the external electronic device, may install a key of the external electronic device on the user's portable terminal, thereby using the external electronic device. The vehicle key may be shared using a separate key provisioning server provided by the manufacturer of the external electronic device. When using the key provisioning server provided by the manufacturer of the external electronic device, the user must pay a separate cost for provision of the key.

If the key of the external electronic device is shared between portable terminals, instead of using the key provisioning server provided by the manufacturer of the external electronic device, a master key of the external electronic device may be shared among a plurality of portable terminals, thereby causing security problems.

Solution to Problem

An electronic device according to various embodiments of the disclosure may include: a processor; at least one communication module configured to support wireless communication; and a security module having an applet installed therein so as to store and manage a shared key to be transmitted to a first external electronic device and an authentication key used in authentication with a second external electronic device, wherein the processor may be configured to receive a request for transmitting the authentication key to the first external electronic device, transmit information for generating the shared key and a command to generate the shared key to the security module, control the security module so as to generate the shared key, based on the information for generating the shared key, and control the security module so as to transmit the generated shared key and information related to the generated shared key to the first external electronic device.

An electronic device according to various embodiments of the disclosure may include: a processor; at least one communication module configured to support wireless communication; and a security module configured to manage information related to an applet that manages an authentication key used in authentication of a second external electronic device and store an applet identification (AID) list and the applet, wherein the security module may be configured to receive a signal requesting the information related to the applet from the first external electronic device, transmit the information related to the applet to the first external electronic device, receive the shared key and information related to the shared key from the first external electronic device, and install the received shared key and the information related to the shared key in the security module.

An operating method of an electronic device according to various embodiments of the disclosure may include: receiving, from the first external electronic device, a request for transmitting a shared key generated based on an authentication key used in authentication with a second external electronic device; transmitting information for generating the shared key and a command to generate the shared key to the security module; controlling the security module so as to generate the shared key, based on the information and the command; and controlling the security module so as to transmit the generated shared key and information related to the generated shared key to the first external electronic device.

Advantageous Effects of Invention

An electronic device and an operating method of an electronic device according to various embodiments of the disclosure are capable of sharing a shared key, which is generated based on a master key stored in a security module of an electronic device, in a secure manner.

An electronic device and an operating method of an electronic device according to various embodiments of the disclosure are capable of sharing a key of an external electronic device using secure-module-to-secure-module (SE2SE) communication standards in electronic devices for transmitting/receiving a key of an external electronic device, which does not require a separate provisioning server, thereby reducing costs related to the provisioning server.

MODE FOR THE INVENTION

Figure 1:
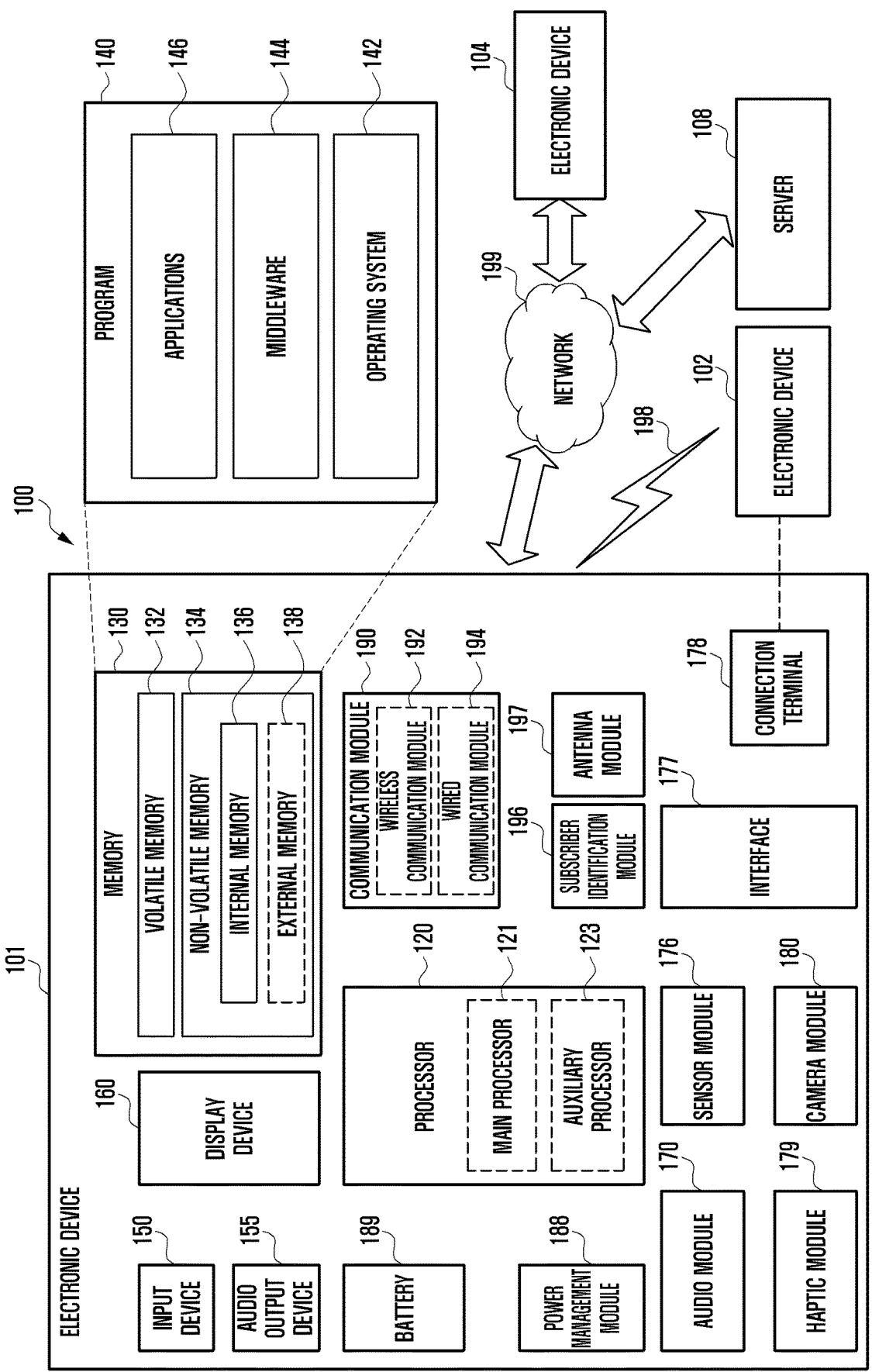
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
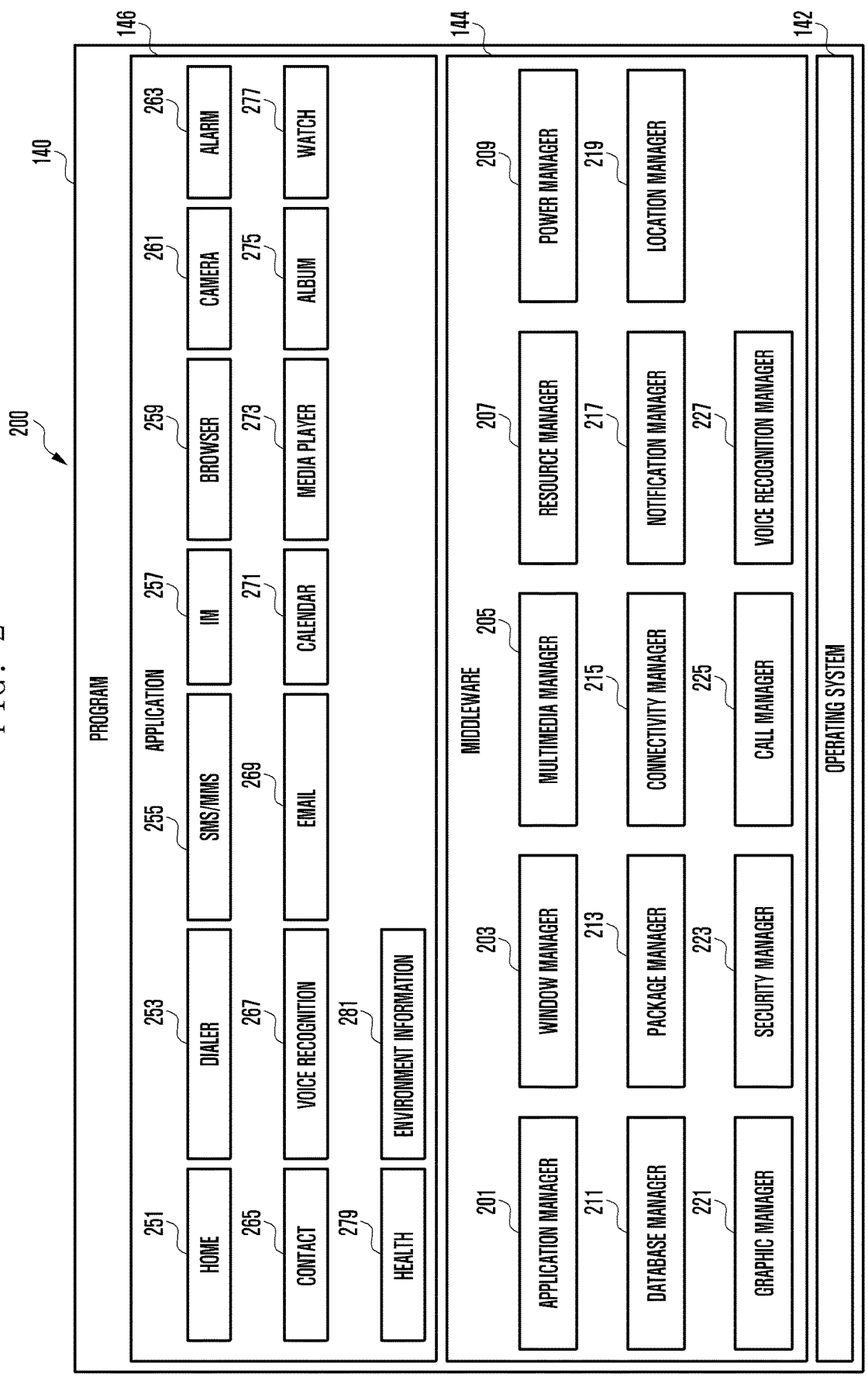
FIG. 2 is a block diagram of a program operating in an electronic device according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
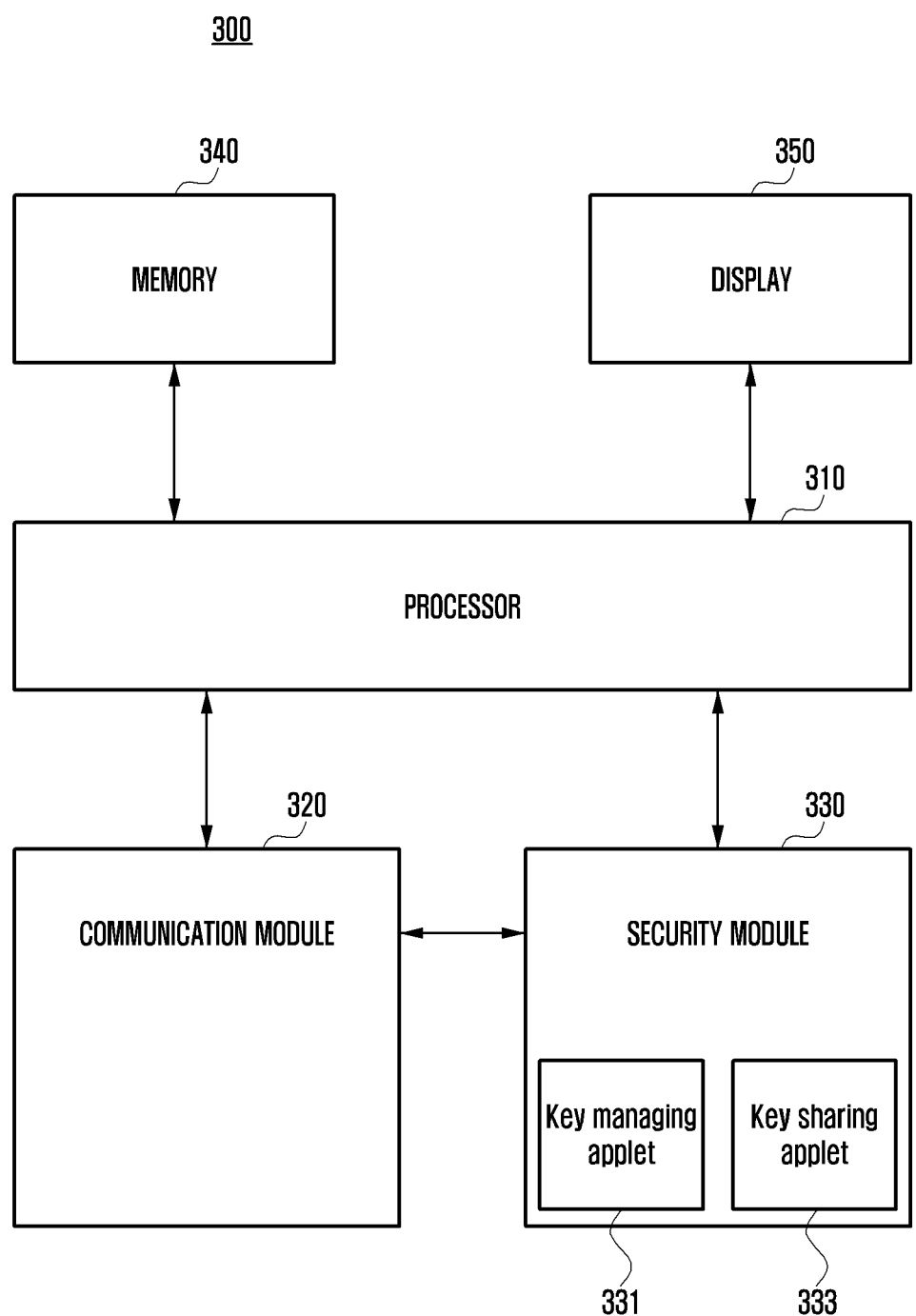
FIG. 3 is a block diagram of an electronic device according to various embodiments of the disclosure.

According to various embodiments of the disclosure, an electronic device (e.g., an electronic device 300 in FIG. 3)

may denote an electronic device that transmits a shared key for authentication between a second external electronic device (e.g., a second external electronic device 1401 in FIG. 14) and a first external electronic device (e.g., a first electronic device 400 in FIG. 4) to the first external electronic device 400.

According to various embodiments of the disclosure, the first external electronic device 400 may denote an electronic device that receives a shared key from the electronic device 300.

According to various embodiments of the disclosure, the second external electronic device 1401 may denote an electronic device capable of providing various functions, based on authentication with the first external electronic device 400 or the electronic device 300. For example, the second external electronic device 1401 may denote an electronic device capable of providing various functions, such as a vehicle or a door lock, after performing authentication.

FIG. 3 is a block diagram of an electronic device according to various embodiments of the disclosure.

Referring to FIG. 3, an electronic device 300 (e.g., the electronic device 101 in FIG. 1) according to various embodiments of the disclosure may include a processor 310 (e.g., the processor 120 in FIG. 1), a communication module 320 (e.g., the communication module 190 in FIG. 1), a security module 330, a memory 340 (e.g., the memory 130 in FIG. 1), and a display 350 (e.g., the display device 160 in FIG. 1).

According to various embodiments of the disclosure, the communication module 320 may establish a communication channel with a first external electronic device (e.g., a first external electronic device 400 in FIG. 4), and may transmit and receive a variety of data to and from the first external electronic device 400. The communication module 320 may transmit and receive a variety of data to and from the first external electronic device 400 using short-range communication (e.g., Bluetooth, NFC, UWB, etc.), but is not limited thereto, and may transmit and receive a variety of data to and from the first external electronic device 400 using a cellular network (e.g., LTE, 5G network, etc.).

According to various embodiments of the disclosure, the security module 330 may be a module that is physically separate from the processor 310 or the memory 340, and may encrypt and store data that is stored in the security module 330. According to another embodiment of the disclosure, the security module 330 may be included in an area of the memory 340, and the security module 330 may be a portion in which data stored in the memory 340 is encrypted and stored.

According to various embodiments of the disclosure, in response to reception of a request for accessing data in the security module 330, the security module 330 may verify the access authority of an entity (e.g., various applications installed in the memory 340 or the like) that requests access to the data or integrity thereof, and may permit access to/editing of the data stored in the security module 330, or may transmit the stored data according to the result of the verification.

According to various embodiments of the disclosure, the security module 330 may store an authentication key used for authentication of the second external electronic device (e.g., a second external electronic device 1401 in FIG. 14), and may manage the stored authentication key. Authentication of the second external electronic device 1401 may indicate an operation of identifying whether or not the electronic device 300 that stores an authentication key has valid authority to perform various functions provided by the second external electronic device 1401.

According to various embodiments of the disclosure, the security module 330 may generate a shared key to be transmitted to the first external electronic device 400 and manage the generated shared key under the control of the processor 310. The shared key transmitted to the first external electronic device 400 may be used in the authentication of the second external device (e.g., the second external device 1401 in FIG. 14), and the first external electronic device 400 that stores the shared key may perform valid authentication with the second external device 1401 using the shared key.

According to various embodiments of the disclosure, the electronic device 300 may share an authentication key stored in the security module 330, or may transmit the authentication key to the first external electronic device 400. For example, the electronic device 300 may generate a shared key using the authentication key stored in the security module 330, and may transmit the generated shared key to the first external electronic device 400. The first external electronic device 400 may store the received shared key in the security module 430 of the first external electronic device 400. The first external electronic device 400 may perform authentication with the second external electronic device 1401 using the received shared key. Hereinafter, a detailed operation in which the processor 310 generates and transmits the shared key will be described.

According to various embodiments of the disclosure, the processor 310 may receive a signal making a request for transmitting, to the first external electronic device 400, an authentication key that is stored in the security module 330 and used for authentication of the electronic device 300 with the second external electronic device 1401. For example, the user of the electronic device 300 may request transmission of an authentication key to the first external electronic device 400 using a user interface of a key management application of the second external electronic device 1401. The processor 310 may transmit information for generating a shared key and a command to generate a shared key to the security module 330 in response to reception of the request for transmitting the authentication key to the first external electronic device 400.

According to various embodiments of the disclosure, the information for generating a shared key may include the name of the user of the first external electronic device 400 and information on a function to be activated, among the functions provided by the second external electronic device 1401. The functions provided by the second external electronic device 1401 may include an available usage time of the second external electronic device 1401 (for example, in the case where the second external electronic device 1401 is a vehicle, the time during which driving of the vehicle is allowed), geofencing limitation data of the second external electronic device 1401 (for example, in the case where the second external electronic device 1401 is a vehicle, the geographic range in which driving of the vehicle is allowed), performance limits of the second external electronic device 1401 (for example, in the case where the second external electronic device 1401 is a vehicle, the maximum permissible speed thereof), and information indicating whether or not various devices included in the second external electronic device 1401 (for example, in the case where the second external electronic device 1401 is a vehicle, the various devices may be a trunk, a console box, and the like) or various functions available to the second external electronic device 1401 (for example, in the case where the second external electronic device 1401 is a vehicle, lane maintenance assistance, lane departure notification, cruise control, adaptive cruise control, or engine availability) are allowed. The information for generating a shared key may be generated by a user input (the name of the user of the first external electronic device 400 and a user input for selecting an activated function from among the functions provided by the second external electronic device 1401) from the user of the electronic device 300 using a user interface of the key management application of the second external electronic device 1401.

According to various embodiments of the disclosure, the information for generating a shared key may include data required for encrypting the generated shared key and transmitting the same to the first external electronic device 400. For example, the information for generating the shared key may include an encryption key required for encryption of the generated shared key using a symmetric encryption method or an asymmetric encryption method.

According to various embodiments of the disclosure, the processor 310 may transmit the shared key generation command and the information for generating a shared key to the security module 330. In response to reception of the shared key generation command, the security module 330 may generate a shared key, based on the received information for generating the shared key. The generation of the shared key may be implemented by a key managing applet 331 installed in the security module 330. The key managing applet 331 may generate a shared key using the information for generating a shared key.

According to various embodiments of the disclosure, the key managing applet 331 may identify the type of the authentication key stored in the security module 330. The type of the authentication key may include a master key or a primary shared key generated based on the master key. For example, the master key may refer to a key provided by the manufacturer of the second external electronic device 1401 at the time of producing the second external electronic device 1401. For example, the primary shared key may refer to a shared key generated based on the master key.

According to various embodiments of the disclosure, the key managing applet 331 331 may generate a primary shared key in response to identifying that the authentication key stored in the security module 330 is a master key.

According to various embodiments of the disclosure, the key managing applet 331 may generate a token for generating a secondary shared key in response to identifying that the authentication key stored in the security module 330 is a primary shared key generated based on the master key. The token for generating a secondary shared key may denote data requesting the generation of a shared key in the second external electronic device 1401. For example, the first external electronic device 400 receiving the token for generating the secondary shared key may establish a communication connection with the second external electronic device 1401, and the second external electronic device 1401 may receive the token for generating the secondary shared key. In response to reception of the token, the second external electronic device 1401 may generate a secondary shared key, based on the master key or the primary shared key stored in the second external electronic device 1401. The secondary shared key generated by the second external electronic device 1401 may be transmitted to the first external electronic device 400.

According to various embodiments of the disclosure, the key managing applet 331 may generate a shared key (in the case where the authentication key stored in the security module 330 is a master key) or a token for generating a shared key (in the case where the authentication key stored in the security module 330 is a shared key), and may transmit the generated shared key or token to a key sharing applet 333 together with information related to the shared key. The information related to the shared key may include an encryption key used by the key sharing applet 333 to encrypt and transmit the generated shared key or token, the name of the user of the first external electronic device 400, and information on a function to be activated among the functions provided by the second external electronic device 1401.

According to various embodiments of the disclosure, the information related to the shared key may include information indicating that the shared key is generated based on the authentication key stored in the electronic device 300. The second external electronic device 1401 may receive the information related to the shared key from the first external electronic device 400, and may verify whether or not the shared key is valid based on the information indicating generation based on the authentication key stored in the electronic device 300.

According to various embodiments of the disclosure, the key sharing applet 333 may receive, from the key managing applet 331, the generated shared key or the token for generating a shared key and the information related to the shared key, and may transmit, to the first external electronic device 400, the generated shared key or the token for generating a shared key and the information related to the shared key using a communication channel established between the first external electronic device 400 and the electronic device 300.

According to various embodiments of the disclosure, the key managing applet 331 and the key sharing applet 333 may be integrated into a single applet. The integrated applet may perform an operation of generating a shared key and information related to a shared key, which may be performed by the key managing applet 331, and an operation of transmitting, to the first external electronic device 400, a shared key and information related to a shared key, which may be performed by the key sharing applet 333.

According to various embodiments of the disclosure, a communication channel may be established between the first external electronic device 400 and the electronic device 300 using short-range communication schemes {e.g., various communication schemes such as near-field communication (NFC), Bluetooth, or UWB} or a cellular network.

Figure 4:
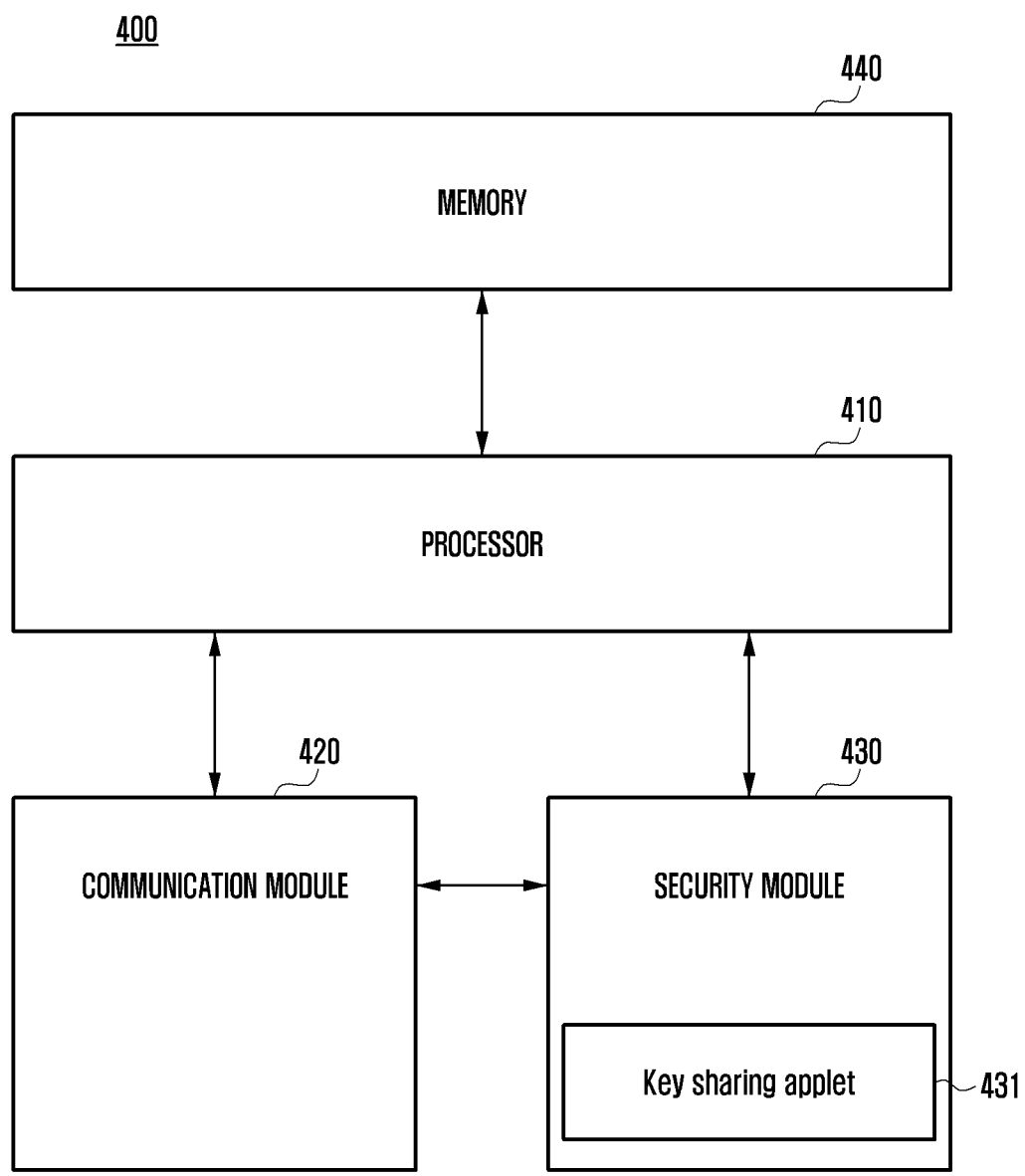
FIG. 4 is a block diagram of a first external electronic device according to various embodiments of the disclosure.

FIG. 4 is a block diagram of a first external electronic device according to various embodiments of the disclosure.

Referring to FIG. 4, according to various embodiments of the disclosure, the first external electronic device 400 may include a processor 410, a communication module 420, a security module 430, and a memory 440.

According to various embodiments of the disclosure, the communication module 420 may establish a communication channel with an electronic device (e.g., the electronic device 300 in FIG. 3), and may transmit and receive a variety of data to and from the electronic device 300. The communication module 420 may transmit and receive a variety of data to and from the electronic device 300 using short-range communication (e.g., Bluetooth, NFC, UWB, etc.), but is not limited thereto, and may transmit and receive a variety of data to and from the electronic device 300 using a cellular network (e.g., LTE, 5G network, etc.).

According to various embodiments of the disclosure, in order to transmit/receive a shared key between the first external electronic device 400 and the electronic device 300, a key sharing applet 431 must be installed in the security module 430 of the first external electronic device 400. A detailed description will be made of installation of the key sharing applet 431 below.

According to various embodiments of the disclosure, the processor 410 may execute a key sharing application installed in the memory 440, and may receive a shared key to be received from the electronic device 300 and a user input of entering information related to the second external electronic device 1401 that performs authentication. The key sharing application may denote an application that is installed in the memory 440 and installs a shared key in the key sharing applet 431 of the security module 430 using the shared key and information related to the shared key received from the electronic device 300.

According to various embodiments of the disclosure, the information related to the second external electronic device 1401 may indicate the information input by the user of the first external electronic device 400 using an interface of the key sharing application. The information related to the second external electronic device 1401 may include the name of the manufacturer (e.g., BMX) of the second external electronic device 1401 and the model name (e.g., X5) of the second external electronic device 1401.

According to various embodiments of the disclosure, the processor 410 may receive information related to the type of shared key, which is input by the user of the first external electronic device 400 using the interface of the key sharing application. The information related to the type of shared key may denote information indicating any one of the same shared key as the key of the second external electronic device 1401 stored in the electronic device 300 or a normal shared key for sharing a car used by a plurality of users. A description thereof will be made later with reference to FIG. 5.

According to various embodiments of the disclosure, the processor 410 may transmit, to the security module 430, the received information related to the second external electronic device 1401 or the information related to the type of shared key and a command to install the key sharing applet 431. The security module 430 may install the key sharing applet 431 corresponding to the identifier (AID) of the manufacturer of the second external electronic device 1401 included in the information related to the second external electronic device 1401. The key sharing applet 431 may receive, from the electronic device 300, a shared key corresponding to the identifier of the manufacturer of the second external electronic device 1401, and may transmit the identifier of the manufacturer to the key sharing applet 333 of the electronic device 300 in order to do so. If the shared key stored in the electronic device 300 does not correspond to the identifier of the manufacturer, the operation of transmitting/receiving the shared key may be terminated.

According to various embodiments of the disclosure, the generated key sharing applet 431 may include user information, information on the second external electronic device 1401, and information on a plurality of encryption keys used for encryption in transmission and reception between the second external electronic device 1401 and the first external electronic device 400. The key sharing applet 431 may include information indicating the status of the received shared key, and the status of the received shared key is defined in Table 1 below.

TABLE 1

| Index | Status | Description |
|---|---|---|
| 1 | INIT | Initial Status |
| 2 | KEY + PRIVILEGE DEACTIVE | Received the Key + Privilege but vehicle have not accepted yet |
| 3 | KEY + PRIVILEGE ACTIVITE | Received the Key + Privilege and vehicle have accepted |
| 4 | Expired | Out of validly |

According to various embodiments of the disclosure, the security module 430 may be a module that is physically separate from the processor 410 or the memory 440 (e.g., the memory 130 in FIG. 1), and may encrypt and store data that is stored in the security module 430. According to another embodiment of the disclosure, the security module 430 may be included in an area of the memory 440, and the security module 430 may refer to a portion in which data stored in the memory 440 is encrypted and stored. In response to reception of a request for accessing data in the security module 430, the security module 430 may verify the access authority of an entity (e.g., various applications installed in the memory 440 or the like) that requests access to the data or integrity thereof, and may permit access to/editing of the data stored in the security module 430, or may transmit the stored data according to the result of the verification.

According to various embodiments of the disclosure, the security module 430 may include a contactless register service (CRS) for managing a key applet of the second external electronic device 1401 used in an operation in which the first external electronic device 400 performs authentication with the second external electronic device 1401. The CRS (not shown) may perform modification, addition, or deletion of data assigned to an applet, based on a user request.

According to various embodiments of the disclosure, the security module 430 may include a proximity vehicle key system environment (PVKSE). The PVKSE (e.g., the PVKSE 510 in FIG. 5) may monitor modification, addition, or deletion of data assigned to a key managing applet installed in the security module 430, and if a change in the data related to a vehicle key applet is detected, may produce information related to the vehicle key applet, or may change the produced information related to the applet. The PVKSE 510 may refer to an element implemented in software separately from the contactless registry service (CRS) for managing data stored in the security module 430. The detailed operation of receiving a shared key using the PVKSE 510 and the CRS 520 will be described with reference to FIG. 5.

According to various embodiments of the disclosure, the key sharing applet 431 installed in the security module 430 may receive a shared key installed in the security module 330 of the electronic device 300 and information related to the shared key through mutual operations with the key sharing applet 333 installed in the security module 330 of the electronic device 300.

According to various embodiments of the disclosure, the shared key received using the key sharing applet 431 may be activated when the second external electronic device 1401 and the first external electronic device 400 are connected to each other for the first time after receiving the shared key. The second external electronic device 1401 may verify the shared key that is transmitted when the first external electronic device 400 is connected, and may determine whether or not to activate the shared key, based on the verification result. The shared key before activation may remain at status 2 in Table 1 (PRIVILEGE DEACTIVE), and the shared key after activation may be changed to status 3 in Table 1 (PRIVILEGE ACTIVE).

According to various embodiments of the disclosure, if a token for generating a secondary shared key is received, the key sharing applet 431 may transmit the token for generating a secondary shared key to the second external electronic device 1401. The second external electronic device 1401 may identify whether or not the token for generating a secondary shared key is generated based on the primary shared key stored in the electronic device 300, thereby verifying the validity of the token for generating a secondary shared key, and may generate a secondary shared key. The generated shared key may be transmitted to the key sharing applet 431. The mutual operation between the second external electronic device 1401 and the first external electronic device 400 will be described later with reference to FIG. 14.

Figure 5:
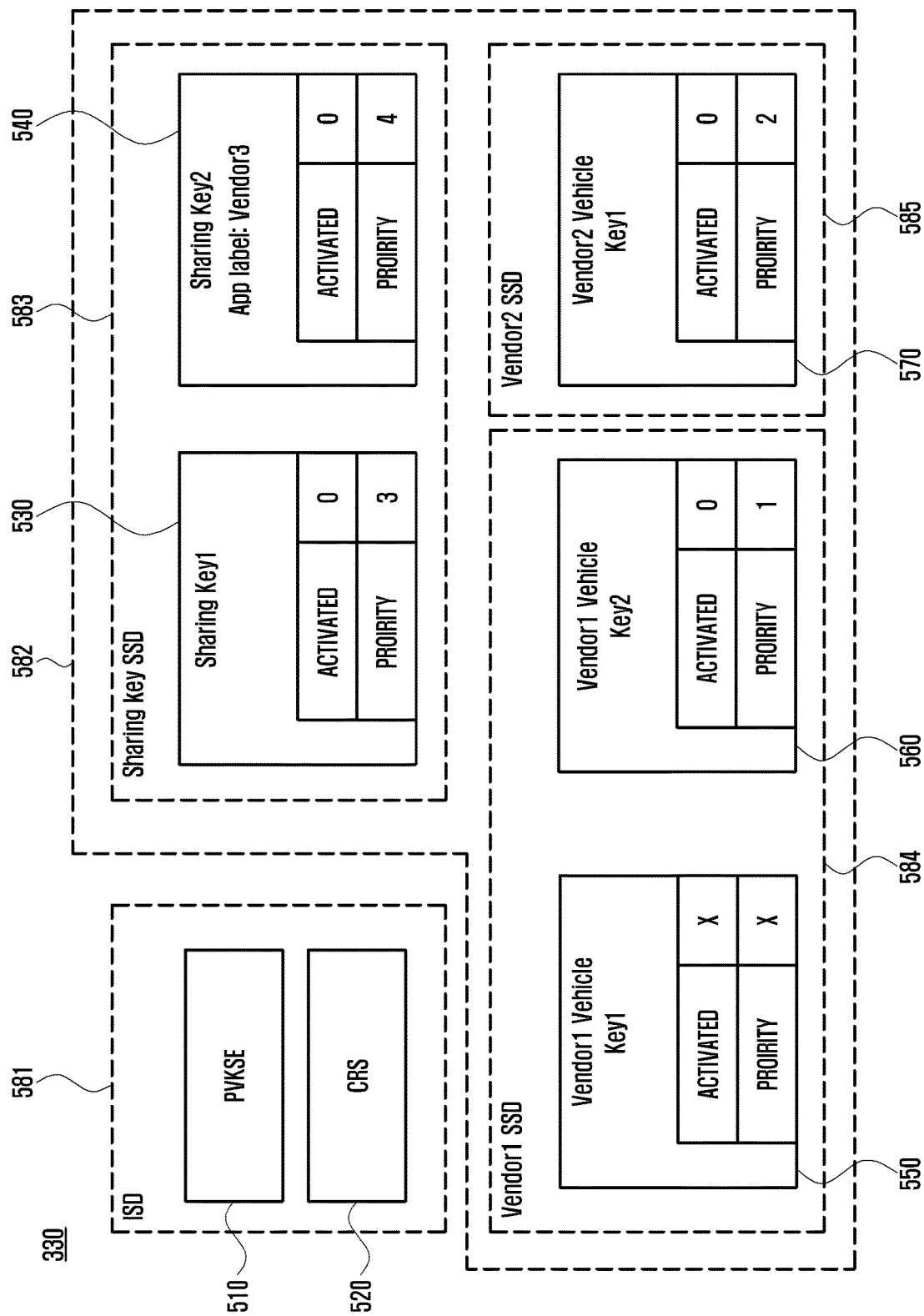
FIG. 5 is a block diagram illustrating a security module in a first external electronic device according to various embodiments of the disclosure.

FIG. 5 is a block diagram illustrating a security module 330 in an electronic device (e.g., the electronic device 300 in FIG. 3) according to various embodiments of the disclosure.

Referring to FIG. 5, the security module 330 of the electronic device 300 according to various embodiments of the disclosure may be divided into an issued security domain (ISD) 581 and a supplementary security domain (SSD) 582.

According to various embodiments of the disclosure, a PVKSE 510 and a CRS 520 may be provided in the ISD 581. The PVKSE 510 may refer to a software element capable of managing data related to at least one key managing applet 530, 540, 550, 560, or 570 of the second external electronic device 1401, which is installed in the SSD 582. The PVKSE 510 may monitor a change in data related to at least one key managing applet 530, 540, 550, 560, or 570 of the second external electronic device 1401, and if a change is detected, may produce information related to an applet by reflecting the change in data or change the same.

According to various embodiments of the disclosure, the PVKSE 510 may manage information related to at least one key managing applet 530, 540, 550, 560, or 570 of the second external electronic device 1401. The information related to the applet may include an applet identification indicating an identifier of the manufacturer of the second external electronic device 1401, an applet label indicating the model of the second external electronic device 1401, priority information indicating the priority of the applet, and applet-specific data.

According to various embodiments of the disclosure, the security module 330 may include a CRS 520 for managing at least one vehicle key managing applet 530, 540, 550, 560, or 570, and may perform management of at least one applet 530, 540, 550, 560, or 570 under the control of the CRS 520.

According to various embodiments of the disclosure, the CRS 520 may refer to a software element for managing files, which is installed in the security module 330. The CRS 520 may perform management of a variety of data (e.g., encryption of data, decryption of encrypted data, etc.) stored in the security module 330, based on a request of the processor (e.g., the processor 310 in FIG. 3), and may move data stored in the security module 330 to the memory (e.g., the memory 350 in FIG. 3).

According to various embodiments of the disclosure, the PVKSE 510 of the security module 330 may produce an AID list that includes applet identifications (AIDs) of the respective vehicle key applets stored in the security module 330. The AID list may be produced and managed by the PVKSE 510.

The electronic device (e.g., the electronic device 300 in FIG. 3) may make a request to the first external electronic device 400 for transmitting the AID list stored in the security module 430 of the first external electronic device 400 in order to transmit a shared key to the first external electronic device 400. For example, the transmission of the AID list stored in the security module 430 of the first external electronic device 400 may be performed using an instruction defined as SELECT PVKSE. The PVKSE 510 may produce and transmit an AID list in response to reception of an instruction defined as SELECT PVKSE.

According to various embodiments of the disclosure, the PVKSE 510 may transmit the AID list to the electronic device 300 in response to a request from the electronic device 300. The key sharing applet 333 of the electronic device 300 may receive an AID list from the first external electronic device 400, and may identify whether or not an AID corresponding to the shared key is included in the AID list. If an AID corresponding to the shared key is included in the received AID list, the key sharing applet 333 may perform an operation of transmitting AID information corresponding to the shared key to the first external electronic device 400.

According to various embodiments of the disclosure, the PVKSE 510 may receive selected AID information transmitted from the key sharing applet 333, and may transmit information related to the applet corresponding to the selected AID {e.g., information related to the second external electronic device 1401 and information on the key sharing applet 431 (the version of the key sharing applet)}.

According to various embodiments of the disclosure, each of the one or more applets 530, 540, 550, 560, and 570 may be stored in the SSD 582. The SSD 582 may be divided into spaces for respective manufacturers of second external electronic devices 1401, and applets corresponding to respective manufacturers may be stored in the corresponding spaces of the SSD 582 divided for the respective manufacturers. For example, the applets 550 and 560 corresponding to manufacturer 1 may be stored in an SSD space 584 corresponding to manufacturer 1, and the applet 570 corresponding to manufacturer 2 may be stored in an SSD space 585 corresponding to manufacturer 2. The SSD 582 may further include an SSD space 583 for separately storing applets 530 and 540 for the shared key for the second external electronic device 1401 that may be shared by various users (e.g., a vehicle that is the target to be shared in the case of car sharing).

According to various embodiments of the disclosure, each of the one or more applets 530, 540, 550, 560, and 570 may include data indicating whether or not the applet is activated. The activated applet may denote an applet capable of performing authentication of the electronic device 300 with the second external electronic device 1401, and the deactivated applet may denote an applet that is unable to perform authentication of the electronic device 300 with the second external electronic device 1401.

According to various embodiments of the disclosure, although FIG. 5 is illustrated based on the embodiment of the security module 330 of the electronic device 300, if the first external electronic device 400 receives a key transmitted by the electronic device 300, the security module 430 of the first external electronic device 400 may store the key transmitted by the electronic device 300 in the same manner as the embodiment described with reference to FIG. 5.

An electronic device (e.g., the electronic device 300 in FIG. 3) according to various embodiments of the disclosure may include: a processor (e.g., the processor 310 in FIG. 3);

at least one communication module (e.g., the communication module 320 in FIG. 3) configured to support wireless communication; and a security module (e.g., the security module 330 in FIG. 3) having an applet installed therein so as to store and manage a shared key to be transmitted to a first external electronic device (e.g., the first external electronic device 400 in FIG. 4) and an authentication key used in authentication with a second external electronic device, wherein the processor 310 may be configured to receive, from the first external electronic device 400, a request for transmitting the authentication key to the first external electronic device, transmit information for generating the shared key and a command to generate the shared key to the security module 330, control the security module 330 so as to generate the shared key, based on the information for generating the shared key, and control the security module 330 so as to transmit the generated shared key and information related to the generated shared key to the first external electronic device 400.

According to various embodiments of the disclosure, the information related to the shared key may include information indicating generation based on the authentication key.

Figure 14:
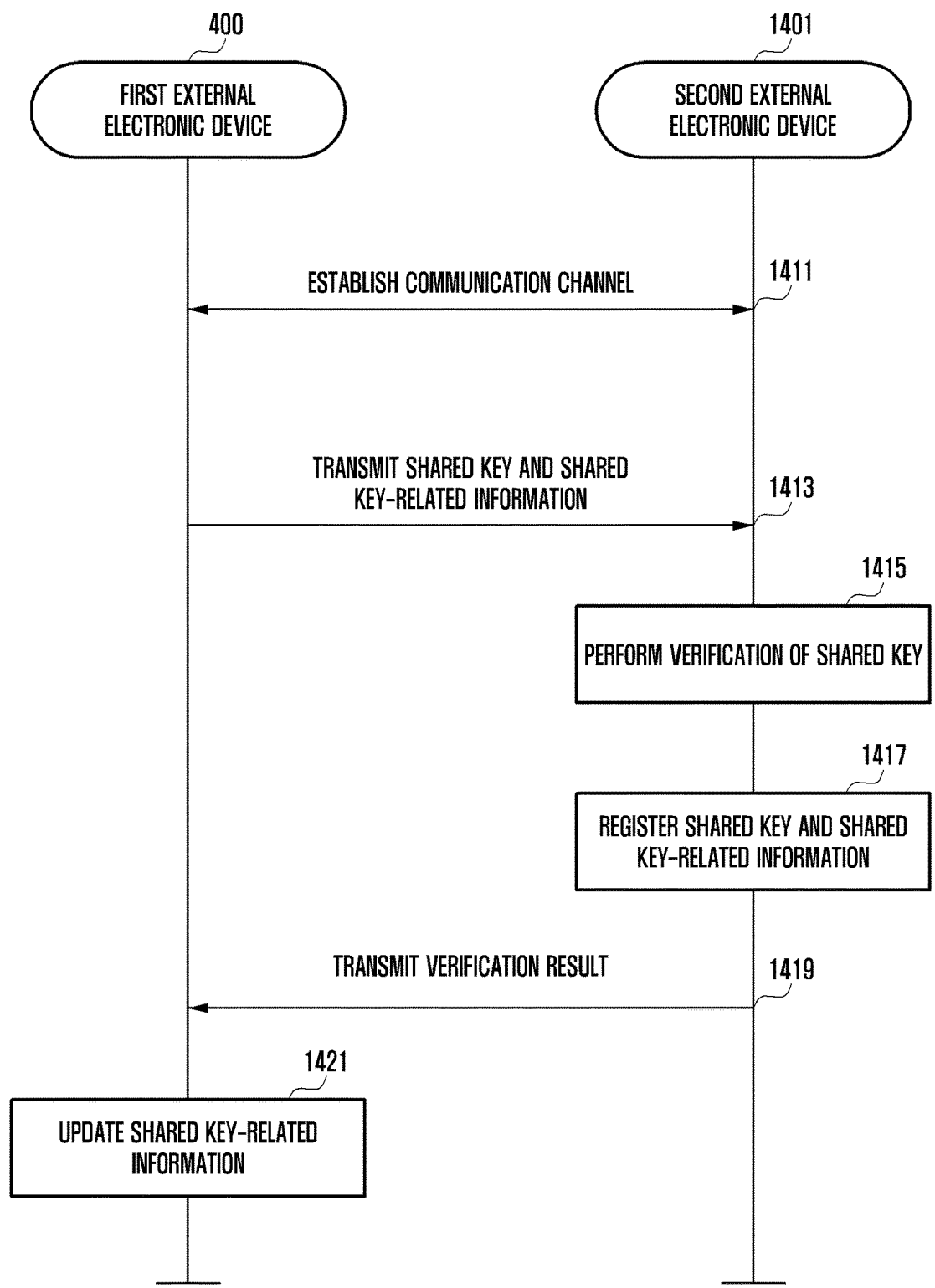
FIG. 14 is a diagram illustrating an embodiment in which a second external electronic device verifies the validity of a shared key between a first external electronic device receiving the shared key and the second external electronic device.

According to various embodiments of the disclosure, the information related to the shared key may include information indicating an instruction to activate at least some of the functions provided by the second external electronic device (e.g., the second external electronic device 1401 in FIG. 14).

According to various embodiments of the disclosure, the input information for generating the shared key may include an available usage time of the second external electronic device 1401 and geofencing limitation data of the second external electronic device 1401.

According to various embodiments of the disclosure, the processor 310 may be configured to transmit, to the security module 330, an encryption key for encryption of the shared key along with the information for generating the shared key.

According to various embodiments of the disclosure, the security module 330 may be configured to receive information related to the applet (e.g., the key sharing applet 431 in FIG. 4) for managing the shared key, which is installed in the security module (e.g., the security module 430 in FIG. 4) of the first external electronic device 400, and determine whether or not to transmit the shared key to the first external electronic device 400, based on the received information related to the applet.

According to various embodiments of the disclosure, the security module 330 is configured to identify whether or not an applet identification included in the information related to the applet is the same as an identifier corresponding to the shared key, and determine whether or not to transmit the shared key to the first external electronic device 400, based on whether or not the applet identification is the same as the identifier corresponding to the shared key.

According to various embodiments of the disclosure, the information related to the applet may include at least one of the address at which the applet is stored, an applet identification, a model identifier of the first external electronic device 400, data indicating whether or not to activate the applet, a priority assigned to each applet, or applet-specific data.

According to various embodiments of the disclosure, the authentication key may be one of either a master key or a key generated based on the master key, and if the authentication key is the key generated based on the master key, the security module 330 may be configured to generate a token indicating that the shared key is generated based on the authentication key and transmit the token and information related to the shared key to the first external electronic device 400.

According to various embodiments of the disclosure, the electronic device 300 may be configured to transmit the shared key and the information related to the shared key to the first external electronic device 400 using the communication module 320.

An electronic device (e.g., the first external electronic device 400 in FIG. 4) according to various embodiments of the disclosure may include: a processor (e.g., the processor 410 in FIG. 4); at least one communication module (e.g., the communication module 420 in FIG. 4) configured to support wireless communication; and a security module 430 configured to manage information related to an applet that manages an authentication key used in authentication of a second external electronic device (e.g., the second external electronic device 1401 in FIG. 14) and store an applet identification (AID) list and the applet, wherein the security module 430 may be configured to receive a signal requesting the information related to the applet from the first external electronic device (e.g., the electronic device 300 in FIG. 3), transmit the information related to the applet to the first external electronic device 300, receive the shared key and information related to the shared key from the first external electronic device 300, and install the received shared key and the information related to the shared key in the security module 430.

According to various embodiments of the disclosure, the processor 420 may be configured to receive information on the second external electronic device 1401 from the first external electronic device 300, identify an applet identification for management of the shared key, based on the information on the second external electronic device 1401, and transmit a command to install the applet to the security module 430.

According to various embodiments of the disclosure, the security module 430 may be configured to, if there is a plurality of applets installed in the security module, deactivate the remaining applets, excluding applets for managing the shared key, and, in response to completion of installation of the shared key, activate the remaining applets.

According to various embodiments of the disclosure, the security module 430 may include a proximity vehicle key system environment (PVKSE) (e.g., the PVKSE 510 in FIG. 5) configured to manage information related to the applet, and the PVKSE 510 may be stored in an issued security domain (e.g., the ISD 581 in FIG. 5) of the security module, and the applet may be stored in a supplementary security domain (e.g., the SSD 582 in FIG. 5).

According to various embodiments of the disclosure, the information related to the shared key may be stored in the first external electronic device 300, and may include information indicating generation based on an authentication key used in authentication of the second external electronic device 1401.

According to various embodiments of the disclosure, the authentication key stored in the first external electronic device 300 may be one of either a master key or a key generated based on the master key, and, if the authentication key is a key generated based on the master key, the security module 430 may be configured to receive a token indicating that the shared key is generated based on the authentication key from the first external electronic device 300, transmit the token to the second external electronic device 1401, and receive a shared key generated based on the token by the second external electronic device 1401.

Figure 6:
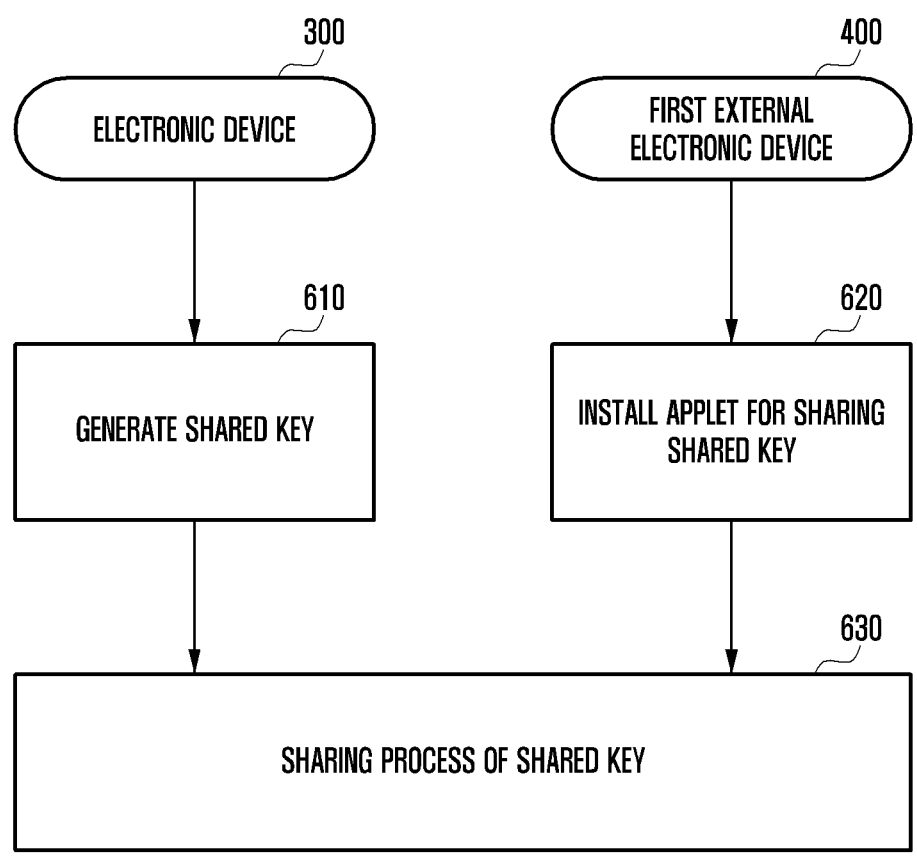
FIG. 6 is an operational flowchart illustrating an operating method of an electronic device according to various embodiments of the disclosure.

FIG. 6 is an operational flowchart of an operating method of an electronic device according to various embodiments of the disclosure. FIG. 6 describes a detailed operation of generating a shared key and sharing the generated shared key between an electronic device (e.g., the electronic device 300 in FIG. 3) and a first external electronic device (e.g., the first external electronic device 400 in FIG. 4).

Referring to FIG. 6, in operation 610, the electronic device 300 may generate a shared key in a security module (e.g., the security module 330 in FIG. 3). The operation of generating the shared key may be performed by a vehicle key applet (e.g., the key managing applet 331 in FIG. 3) installed in the security module 330. The shared key generated by the key managing applet 331 may be transmitted to a key sharing applet (e.g., the key sharing applet 333 in FIG. 3) installed in the security module 330 in order to transmit the same to the first external electronic device 400. A detailed operation of generation of the shared key will be described later with reference to FIG. 7.

In operation 620, the first external electronic device 400 may install a key sharing applet (e.g., the key sharing applet 431 in FIG. 4) for receiving a shared key in the security module (e.g., the security module 430 in FIG. 4). A detailed operation of installing the key sharing applet 431 will be described later with reference to FIG. 9.

In operation 630, the electronic device 300 and the first external electronic device 400 may transmit/receive the shared key generated in operation 610. A process of sharing the shared key may be performed between the key sharing applet 333 installed in the security module 330 of the electronic device 300 and the key sharing applet 431 installed in the security module 430 of the first external electronic device 400. A detailed operation of transmitting/receiving the shared key will be described later with reference to in FIGS. 10 to 13.

Figure 7:
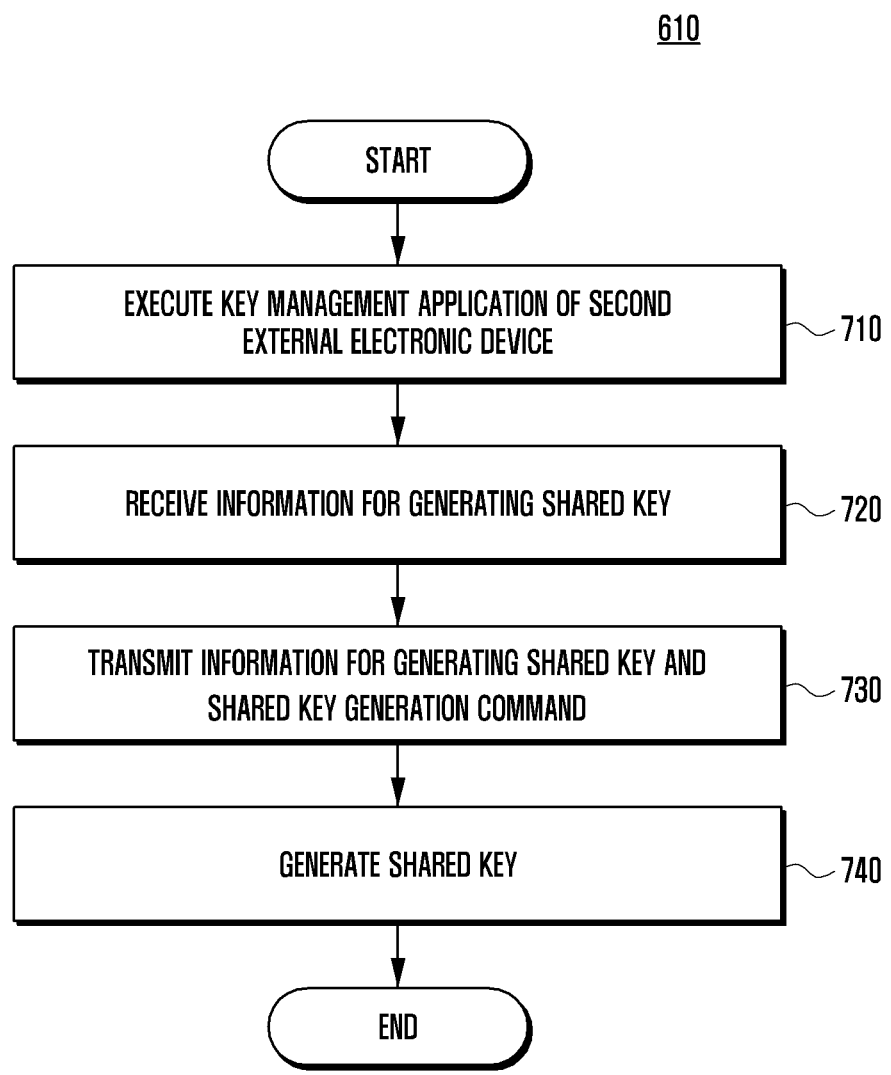
FIG. 7 is an operational flowchart illustrating a method of generating a shared key used for authentication of a second external electronic device in an electronic device and an operating method of an electronic device according to various embodiments of the disclosure.

FIG. 7 is an operational flowchart illustrating a method of generating a shared key used for authentication of a second external electronic device in an electronic device and an operating method of an electronic device according to various embodiments of the disclosure.

FIG. 7 illustrates a detailed description of the operation of generating a shared key (operation 610) described in FIG. 6.

Referring to FIG. 7, in operation 710, the processor 310 of the electronic device (e.g., the electronic device 300 in FIG. 3) may execute a key management application of the second external electronic device (e.g., the second external electronic device 1401 in FIG. 14) in response to a user input. The key management application of the second external electronic device 1401 is an application installed in the memory (e.g., the memory 340 in FIG. 3), and may control a vehicle key managing applet stored in the security module (e.g., the security module 330 in FIG. 3).

According to various embodiments of the disclosure, the processor 310 may receive a signal requesting transmission of an authentication key used for authentication of the electronic device 300 with a vehicle to the first external electronic device 400. For example, the user of the electronic device 300 may make a request for transmitting an authentication key to the first external electronic device 400 using a user interface of the key management application of a vehicle.

In operation 720, the processor 310 may receive a user input including information for generating a shared key. According to various embodiments of the disclosure, the processor 310 may receive a user input of entering information for generating a shared key using a user interface provided by the key management application of the second external electronic device.

According to various embodiments of the disclosure, the information for generating a shared key may include the name of the user of the first external electronic device 400 and information on functions to be activated among the functions provided by the second external electronic device 1401. The functions provided by the second external electronic device 1401 may include an available usage time of the second external electronic device 1401 (for example, in the case where the second external electronic device 1401 is a vehicle, the time during which driving of the vehicle is allowed), geofencing limitation data of the second external electronic device 1401 (for example, in the case where the second external electronic device 1401 is a vehicle, the geographic range in which driving of the vehicle is allowed), performance limits of the second external electronic device 1401 (for example, in the case where the second external electronic device 1401 is a vehicle, the maximum permissible speed thereof), and information indicating whether or not use of various devices included in the second external electronic device 1401 (for example, in the case where the second external electronic device 1401 is a vehicle, the various devices may be a trunk, a console box, and the like) or various functions available to the second external electronic device 1401 (for example, in the case where the second external electronic device 1401 is a vehicle, lane maintenance assistance, lane departure notification, cruise control, adaptive cruise control, or engine availability) is permitted. The information for generating a shared key may be produced by a user input (the name of the user of the first external electronic device 400 and a user input for selecting an activated function from among the functions provided by the second external electronic device 1401) from the user of the electronic device 300 using a user interface of the key management application of the second external electronic device 1401.

According to various embodiments of the disclosure, the information for generating a shared key may include data required for encrypting the generated shared key and transmitting the same to the first external electronic device 400. For example, the information for generating a shared key may include an encryption key required for encryption of the generated shared key using a symmetric encryption method or an asymmetric encryption method.

According to various embodiments of the disclosure, an authentication operation for the electronic device 300 to perform operation 730 may be added subsequent to operation 720. If user authentication is successful, the processor 310 may transmit the information for generating a shared key and a command to generate a shared key to the security module 330. The user authentication may be performed by various methods {for example, the methods may include a method of entering a pin number and a method of inputting a user's biometric information (e.g., fingerprint input, iris recognition, or face recognition)}.

In operation 730, the processor 310 may transmit the information for generating a shared key and the shared key generation instruction to the security module 330.

According to various embodiments of the disclosure, the generation of a shared key may be performed by the key managing applet 331 installed in the security module 330. The key managing applet 331 may generate a shared key using the information for generating a shared key.

In operation 740, the key managing applet 331 may generate a shared key and information related to the shared key, based on the information for generating a shared key.

According to various embodiments of the disclosure, the shared key may refer to a key required to perform authentication with the second external electronic device 1401 in order for the first external electronic device 400 to activate various functions of the second external electronic device 1401.

According to various embodiments of the disclosure, the information related to the shared key may include information indicating that the shared key is generated based on the authentication key stored in the electronic device 300. The second external electronic device 1401 may receive the information related to the shared key from the first external electronic device 400, and may verify whether or not the shared key is valid based on the information indicating that the shared key is generated based on the authentication key stored in the electronic device 300.

Figure 8:
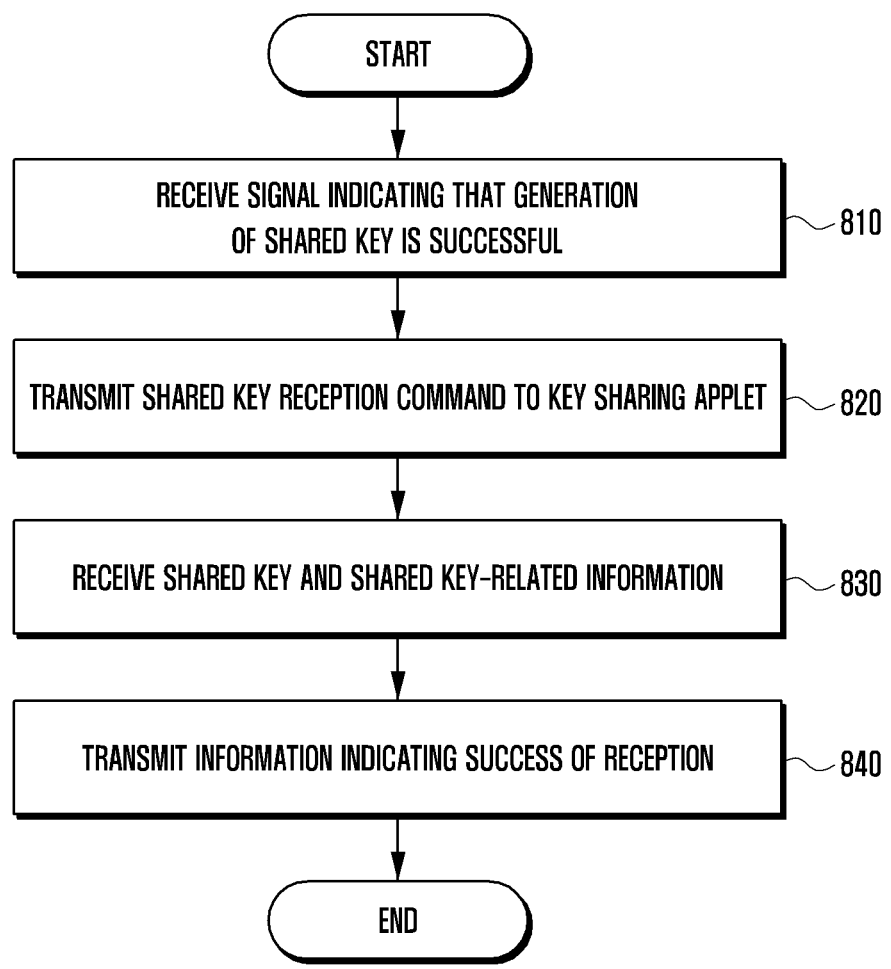
FIG. 8 is an operational flowchart illustrating a method of storing a generated shared key in a key sharing applet of a security module in an electronic device and an operating method of an electronic device according to various embodiments of the disclosure.

FIG. 8 is an operational flowchart illustrating a method of storing a shared key generated by a key managing applet 331 in a key sharing applet 333 of a security module 330 in an electronic device and an operating method of an electronic device according to various embodiments of the disclosure.

According to various embodiments of the disclosure, if the key managing applet 331 of the electronic device 300 supports SE2SE (a communication standard for transmitting data from a security module to another security module), the key managing applet 331 may directly transmit a shared key and information related to the shared key to the key sharing applet 431 of the first external electronic device 400, instead of using the key sharing applet 333. In this case, the operation illustrated in FIG. 8 may be omitted.

In operation 810, in response to receiving, from the key managing applet 331, a signal indicating that generation of the shared key is successful, the key management application of the second external electronic device 1401 of the electronic device 300 may transmit, to a key sharing application of the electronic device 300, a signal indicating that the shared key generation operation is successful. For example, the key sharing application may denote an application that is installed in the memory (e.g., the memory 340 in FIG. 3) of the electronic device 300 and manages the operation of the key sharing applet 333 installed in the security module 330.

In operation 820, the key sharing application may transmit a command to receive a shared key to the key sharing applet 333 installed in the security module 330.

According to various embodiments of the disclosure, the key sharing application may transmit a command to receive a shared key to the key sharing applet 333 that matches the AID corresponding to the shared key.

In operation 830, in response to receiving the command to receive the shared key transmitted by the key sharing application, the key sharing applet 333 may receive the shared key and shared key-related information transmitted by the key managing applet 331. According to an embodiment, the key sharing applet 333 may make a request for the shared key and the shared key-related information to the key managing applet 331. For example, in response to receiving the request for the shared key and the shared key-related information transmitted from the key sharing applet 333, the key managing applet 331 may transmit the shared key and the shared key-related information to the key sharing applet 333.

In operation 840, the key sharing applet 333 may transmit, to the key sharing application, information indicating that the reception of the shared key and the shared key-related information was successful.

Figure 9:
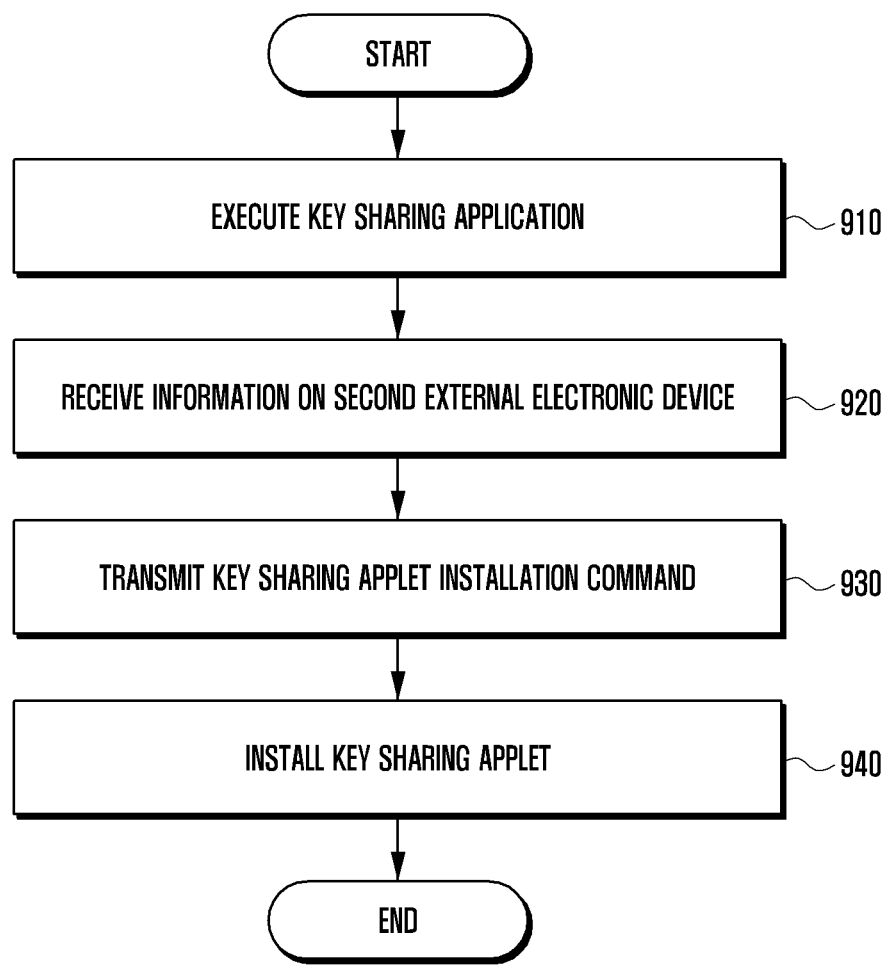
FIG. 9 is an operational flowchart illustrating a method of installing an applet for receiving a shared key in a first external electronic device receiving a shared key in an electronic device and an operating method of an electronic device according to various embodiments of the disclosure.

FIG. 9 is an operational flowchart illustrating a method (operation 620) of installing an applet for receiving a shared key in a first external electronic device 400 according to various embodiments of the disclosure.

Referring to FIG. 9, in operation 910, the processor (e.g., the processor 410 in FIG. 4) may perform a key sharing application. The key sharing application may be installed in the memory (e.g., the memory 440 in FIG. 1) of the first external electronic device 400, and may refer to an application for installing a key sharing applet (e.g., the key sharing applet 431 in FIG. 4) for receiving a shared key and information related to the shared key from the electronic device (e.g., the electronic device 300 in FIG. 3). For example, the key sharing application may provide and change the status of priority of the installed shared key, the activation or deactivation status thereof, and information on available functions of a vehicle.

In operation 920, the processor 410 may receive a user input for information related to the second external electronic device (e.g., the second external electronic device 1401 in FIG. 14). The information related to the second external electronic device 1401 may denote the information entered by the user of the first external electronic device 400 using an interface of the key sharing application. The information related to the second external electronic device 1401 may include the name of the manufacturer (e.g., BMX) of the second external electronic device 1401 and the model name (e.g., X5) of the second external electronic device 1401.

According to various embodiments of the disclosure, the processor 410 may receive information related to the type of shared key, which is input by the user of the first external electronic device 400 using an interface of the key sharing application. The information related to the type of shared key may denote information indicating one of either a shared key that is the same as the key of the second external electronic device 1401 stored in the electronic device 300 or a normal shared key for sharing a car used by a plurality of users.

In operation 930, the processor 410 may transmit, to the security module 430, the received information related to the second external electronic device 1401 or the information related to the type of shared key and a command to install the key sharing applet 431.

According to various embodiments of the disclosure, an authentication operation of the first external electronic device 400 to perform operation 940 may be added subsequent to operation 930. If user authentication is successful, the processor 410 may transmit a command to install the key sharing applet 431 to the security module 430. The user authentication may be performed by various methods {for example, the methods may include a method of entering a pin number and a method of inputting a user's biometric information (e.g., fingerprint input, iris recognition, or face recognition)}.

In operation 940, the security module 430 may install the key sharing applet 431 corresponding to the identifier (AID) of the manufacture of the second external electronic device 1401, which is included in the information related to the second external electronic device 1401.

According to various embodiments of the disclosure, the generated key sharing applet 431 may include user information, information on the second external electronic device

1401, and information on a plurality of encryption keys used for encryption in transmission and reception between the second external electronic device 1401 and the first external electronic device 400. The key sharing applet 431 may include information indicating the status of the received shared key, and the status of the received shared key is defined in Table 1 below.

According to various embodiments of the disclosure, the key sharing applet 431 may transmit the identifier of the manufacturer to the key sharing applet 333 of the electronic device 300 in order to receive a shared key corresponding to the identifier of the manufacturer of a vehicle. If the shared key stored in the electronic device 300 does not correspond to the identifier of the manufacturer, the operation of transmitting/receiving the shared key may be terminated.

Figure 10:
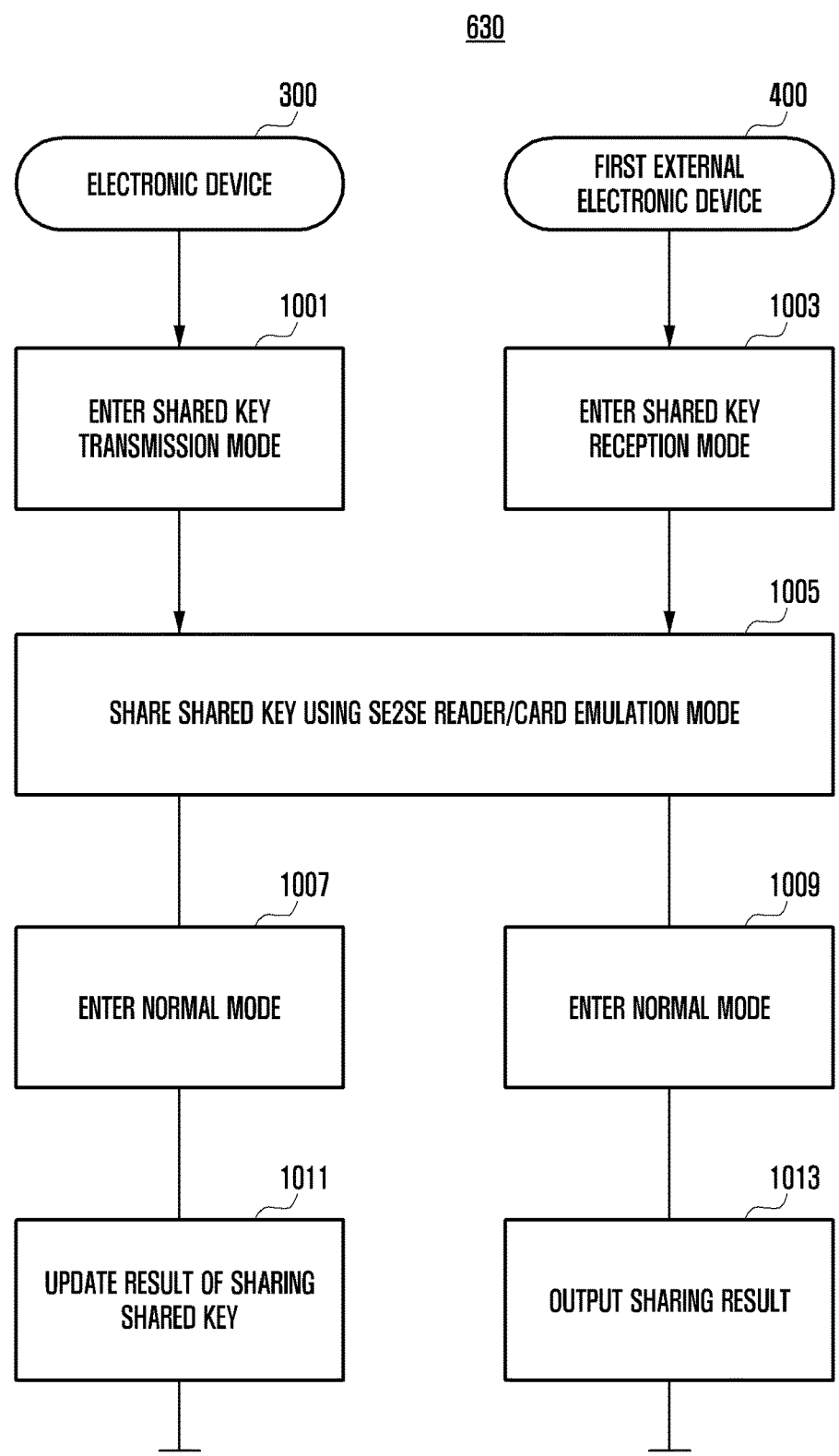
FIG. 10 is an operational flowchart illustrating a detailed method of transmitting/receiving a shared key in an electronic device and an operating method of an electronic device according to various embodiments of the disclosure.

FIG. 10 is an operational flowchart illustrating a detailed method of transmitting/receiving a shared key in an electronic device and an operating method of an electronic device according to various embodiments of the disclosure.

Referring to FIG. 10, in operation 1001, an electronic device (e.g., the electronic device 300 in FIG. 3) may enter a shared key transmission mode to transmit a shared key to the first external electronic device (e.g., the first external electronic device 400 in FIG. 4). In the case where the shared key is transmitted/received using short-range communication (e.g., NFC), the electronic device 300 may operate in an NFC reader mode. The shared key transmission mode may include a detailed operation of switching the communication module 320 of the electronic device 300 to an NFC reader mode. The electronic device 300 may enter the shared key transmission mode, and may transmit a signal making a request for transmitting an AID list to the first external electronic device 400. A detailed operation of entering the shared key transmission mode will be described later with reference to FIG. 11.

In operation 1003, the first external electronic device 400 may enter a shared key reception mode for receiving a shared key transmitted by the electronic device 300. In the case where a shared key is transmitted/received using short-range communication (e.g., NFC), the first external electronic device 400 may receive a shared key while operating in an NFC card mode.

In operation 1005, the electronic device 300 and the first external electronic device 400 may share the shared key using a secure-module-to-secure-module (SE2SE) reader/card emulation mode. The electronic device 300 may operate in the NFC reader mode, and the first external electronic device 400 may operate in the NFC card mode. Details of operation 1005 will be described later with reference to FIG. 12.

In operation 1007, the electronic device 300, having transmitted the shared key, may enter a normal mode from the shared key transmission mode. The normal mode may denote a mode that supports both a listening mode capable of receiving a signal transmitted by another external electronic device and a polling mode for broadcasting a signal for another external electronic device to recognize the existence of the electronic device 300 in order to establish a communication channel. Details of operation 1007 will be described later with reference to FIG. 13.

In operation 1009, the first external electronic device 400, having received the shared key, may enter a normal mode from the shared key reception mode. The normal mode may denote a mode that supports both a listening mode capable of receiving a signal transmitted by another external electronic device and a polling mode for broadcasting a signal for another external electronic device to recognize the existence of the first external electronic device 400 in order to establish a communication channel.

In operation 1011, the electronic device 300 may receive a notification indicating a result of sharing the shared key (failure or success), and may update history information of the key management application of the second external electronic device using the result of sharing the shared key.

According to various embodiments of the disclosure, the electronic device 300 may provide information such that the user of the electronic device 300 may recognize the result of sharing the shared key. For example, the information may be provided to the user through a display device (e.g., the display device 160 in FIG. 1) of the first electronic device 300 or a sound output device (e.g., the sound output device 155 in FIG. 1) thereof.

In operation 1013, the first external electronic device 400 may receive a notification indicating the result of sharing the shared key (failure or success), and may output the sharing result such that the user of the first external electronic device 400 may recognize the same. For example, information may be provided to the user through a display device (e.g., the display device 160 in FIG. 1) of the first external electronic device 400 or a sound output device (e.g., the sound output device 155 in FIG. 1) thereof.

According to various embodiments of the disclosure, the shared key stored in the first external electronic device 400, having successfully received the shared key, may still be in an inactive state. For example, the shared key may be activated after verifying the shared key of the second external electronic device 1401 upon establishing a communication connection with the second external electronic device 1401.

Figure 11:
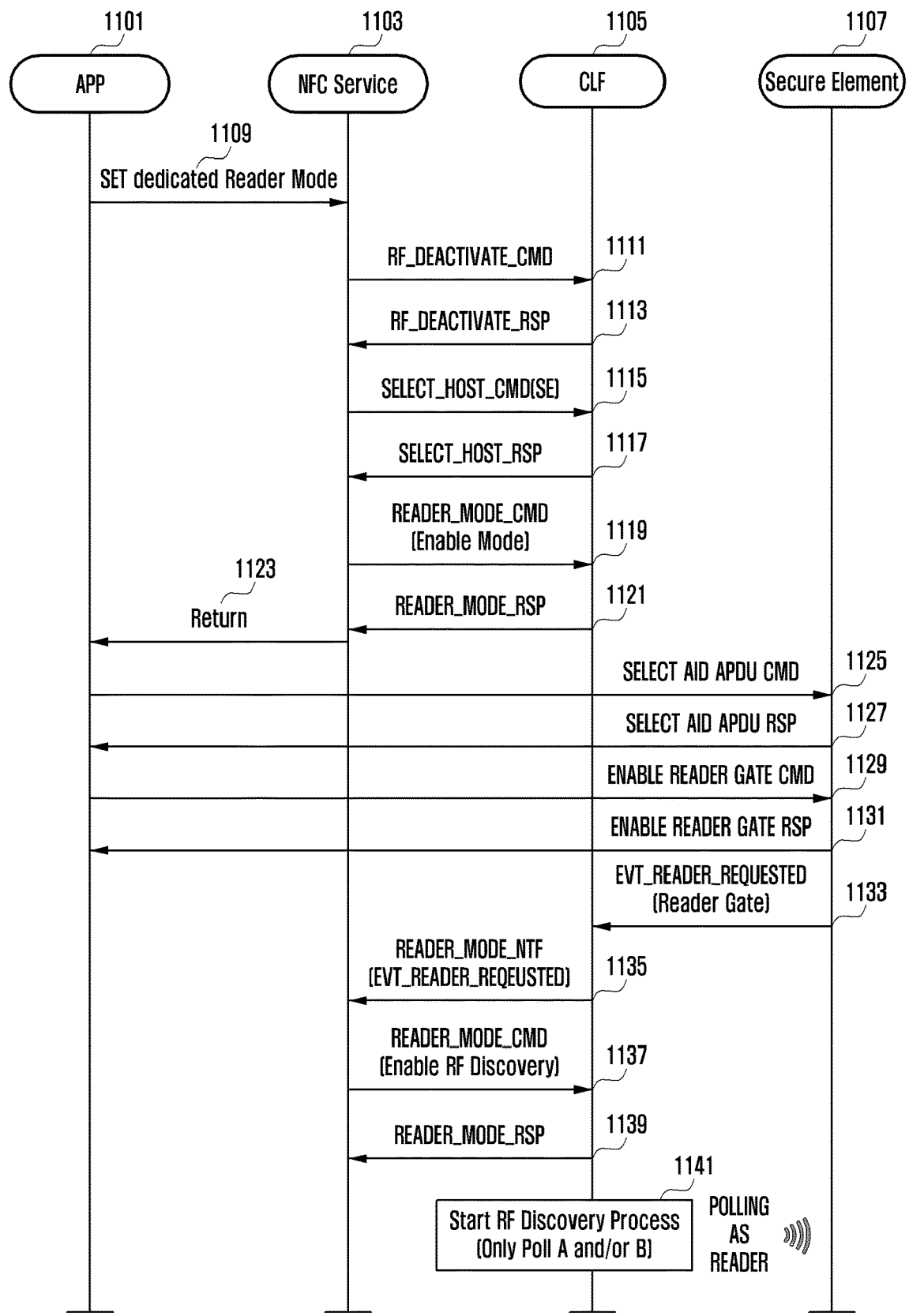
FIG. 11 is a diagram illustrating a transmission mode in which an electronic device transmitting a shared key transmits the shared key to a first external electronic device.

FIG. 11 is a diagram illustrating a transmission mode in which an electronic device transmitting a shared key transmits a shared key. The embodiment illustrated in FIG. 11 is a description of the embodiment of entering the mode for transmitting a shared key (operation 1001) in the embodiment illustrated in FIG. 10. Referring to FIG. 11, according to various embodiments of the disclosure, an electronic device (e.g., the electronic device 300 in FIG. 3) may include a key management application or a key sharing application 1101 of the second external electronic device, an NFC service 1103, a contactless front end (CLF) 1105, and a security module 1107 (e.g., the security module 330 in FIG. 3). The embodiment illustrated in FIG. 11 may be performed between the operation entities of the electronic device (e.g., the electronic device 300 in FIG. 3), that is, the second external electronic device key management application 1101, the NFC service 1103, the contactless front end (CLF) 1105, and the security module 1107.

According to various embodiments of the disclosure, the NFC service 1103 may denote a control circuit included in a communication module (e.g., the communication module 320 in FIG. 3). The CLF 1105 may denote a front-end circuit that includes an antenna for performing NFC communication.

In operation 1109, the key management application or key sharing application 1101 of the second external electronic device may perform control to configure the NFC service 1103 in a specified NFC reader mode. The NFC service 1103 may perform control such that the CLF 1105 operates in an NFC reader mode in response to reception of a signal transmitted from the key management application or key sharing application 1101 of the second external electronic device.

In operation 1111, the NFC service 1103 may transmit a command (RF_DEACTIVATE_CMD) to deactivate the CLF 1105 to the CLF 1105.

According to various embodiments of the disclosure, the CLF 1105 may deactivate a previously performed mode, and may operate in an NFC reader mode. In operation 1113, the CLF 1105 may transmit, to the NFC service 1103, a response signal (RF_DEACTIVATE_RSP) to the deactivation command.

In operation 1115, the NFC service 1103 may transmit a signal (SELECT_HOST_CMD) for selecting a host (the security module) to the CLF 1105. For example, the host may denote an entity for receiving the received data or an entity having data to be transmitted. In this embodiment, since the shared key exists in the security module 1107, the host may correspond to the security module 1107. In operation 1117, the CLF 1105 may transmit, to the NFC service 1103, a response signal (SELECT_HOST_RSP) to the host selection signal transmitted in operation 1115.

In operation 1119, the NFC service 1103 may transmit a command (READER_MODE_CMD) to activate a reader mode to the CLF 1105. In operation 1121, the CLF 1105 may transmit, to the NFC service 1103, a response signal (READER_MODE_RSP) to the command to activate the reader mode. In operation 1123, the NFC service 1103 may transmit a result to the second external electronic device key management application or key sharing application 1101.

In operation 1125, the second external electronic device key management application or key sharing application 1101 may transmit a command (SELECT AID APDU CMD) to select an AID to the security module 1107. In operation 1127, the security module 1107 may transmit a response signal (SELECT AID APDU RSP) to the command to select the AID to the second external electronic device key management application or key sharing application 1101.

In operation 1129, the second external electronic device key management application or key sharing application 1101 may transmit a command (ENABLE READER GATE CMD) to enable a reader gate to the security module 1107. The command to activate the reader gate may indicate an operation in which the security module 1107 prepares to transmit a shared key and shared key-related data. In operation 1131, the security module 1107 may transmit a response signal (ENABLE READER GATE RSP) to the command to enable the reader gate to the second external electronic device key management application 1101.

In operation 1133, the security module 1107 may transmit, to the CLF 1105, a signal making a request (EVT_READER_REQUESTED) for operating in a reader mode. In operation 1135, the CLF 1105 may transmit, to the NFC service 1103, a signal making a request (READER_MODE_NTF) for operating in the reader mode, which is transmitted from the security module 1107.

In operation 1137, the NFC service 1103 may transmit a command (READER_MODE_CMD) to operate in the reader mode to the CLF 1105. The CLF 1105 may transmit, to the NFC service 1103, a response signal (READER_MODE_RSP) to the command to operate in the reader mode in operation 1139, and the CLF 1105 may enter a shared key transmission mode in operation 1141. The shared key transmission mode may indicate a mode supporting a polling mode in which a signal is broadcast in order for the first external electronic device 400 to recognize the existence of the electronic device 300.

Figure 12:
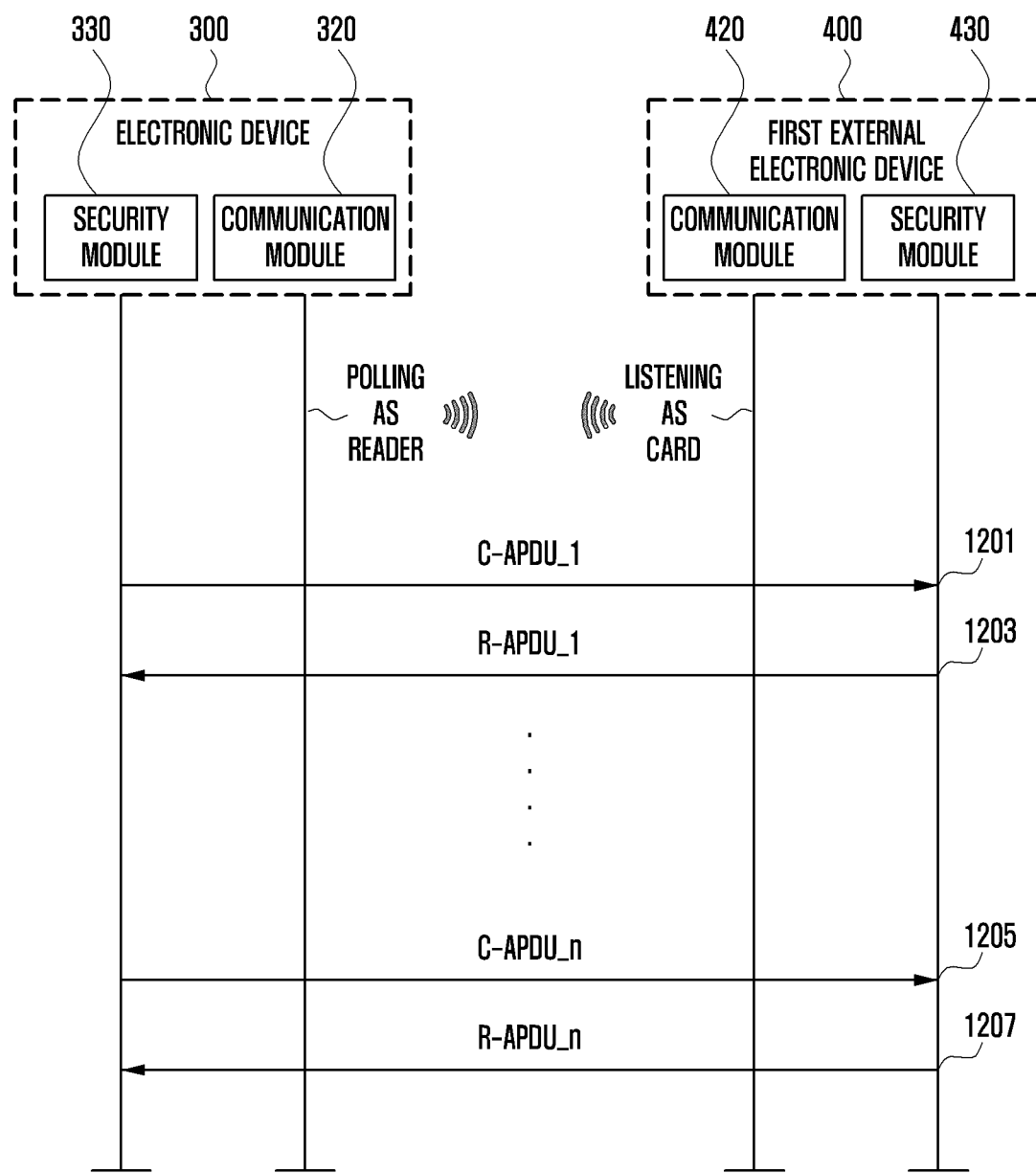
FIG. 12 is an operational flowchart illustrating specific data for transmitting/receiving a shared key in an electronic device and an operating method of an electronic device according to various embodiments of the disclosure.

FIG. 12 is a flowchart illustrating an operation of transmitting/receiving a shared key in an electronic device and an operating method of an electronic device according to various embodiments of the disclosure. The embodiment illustrated in FIG. 12 relates to the operation (operation 1005) of sharing the shared key in the embodiment illustrated in FIG. 10.

The embodiment illustrated in FIG. 12 relates to an operation (e.g., operation 1005 in FIG. 10) of transmitting and receiving a shared key and information related to the shared key between the electronic device (e.g., the electronic device 300 in FIG. 3) and the first external electronic device (e.g., the electronic device 400 in FIG. 4).

Referring to FIG. 12, according to an embodiment, the electronic device 300, transmitting a shared key and information related to the shared key, may operate in a reader mode, and the first external electronic device 400, receiving a shared key and information related to the shared key, may operate in a card mode.

The data transmitted and received by the electronic device 300 and the first external electronic device 400 may follow the data standard defined as a single application protocol data unit (APDU). The data transmitted while the electronic device 300 transmits a command to the first external electronic device 400 may be defined as a command-application protocol data unit (C-APDU), and the data transmitted while the first external electronic device 400 responds to the electronic device 300 may be defined as a response-application protocol data unit (R-APDU). According to various embodiments of the disclosure, the electronic device 300 and the first external electronic device 400 may perform the following operations using the data standards defined in the C-APDU and R-APDU formats.

First, the security module 330 of the electronic device 300 may make a request to the first external electronic device 400 for transmitting an AID list using the communication module 320. The security module 430 of the first external electronic device 400 may transmit an AID list to the electronic device 300 through the communication module 420.

The security module 330 of the electronic device 300 may select an AID corresponding to a shared key to be transmitted from the received AID list, and may make a request to the first external electronic device 400 for transmitting information indicating the selected AID and information related to a key sharing applet corresponding to the selected AID. The security module 430 of the first external electronic device 400 may transmit, to the electronic device 300, information related to the key sharing applet (e.g., information on the version of the key sharing applet and user information) through the communication module 420.

The security module 330 of the electronic device 300 may identify the information related to the key sharing applet, and may identify the status of the key sharing applet (the status defined in Table 1).

The security module 330 of the electronic device 300 and the security module 430 of the first external electronic device 400 may perform mutual authentication using an encryption key, and if the mutual authentication is completed, the security module 330 may transmit a generated shared key and information related to the shared key to the security module 430 of the first external electronic device 400 using the communication module 320.

The security module 430 of the first external electronic device 400 may receive the shared key and the information related to the shared key from the electronic device 300, and may change the status of the shared key included in the information related to the shared key to the inactive status.

According to various embodiments of the disclosure, the transmission and reception of data between the electronic device 300 and the first external electronic device 400 described above may be performed according to the data standards of the C-APDU and the R-APDU illustrated in operations 1201, 1203, 1205, and 1207.

Figure 13:
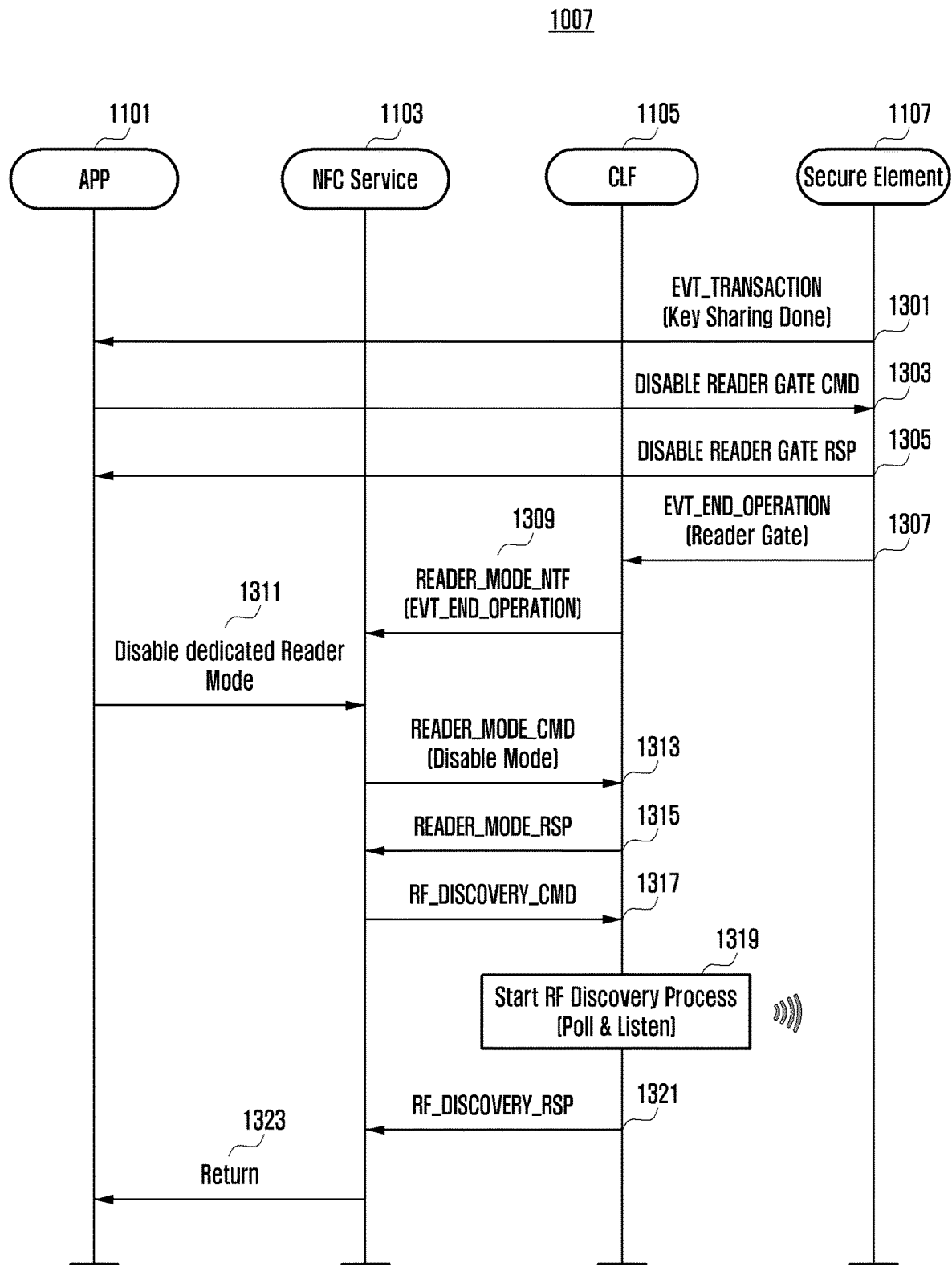
FIG. 13 is a diagram illustrating an embodiment in which an electronic device transmitting a shared key switches from a transmission mode for transmitting the shared key to a normal mode.

FIG. 13 is a diagram illustrating an embodiment in which an electronic device transmitting a shared key switches from a transmission mode for transmitting a shared key to a normal mode.

Referring to FIG. 13, an embodiment in which an electronic device (e.g., the electronic device 300 in FIG. 3) switches to a normal mode after transmitting a shared key and information related to the shared key to a first external electronic device (e.g., the electronic device 400 in FIG. 4) is illustrated. The embodiment illustrated in FIG. 13 relates to the operation (operation 1007) of switching from the shared key transmission mode to the normal mode after the operation of sharing the shared key is completed in the embodiment illustrated in FIG. 10.

Referring to FIG. 13, according to various embodiments of the disclosure, the electronic device (e.g., the electronic device 300 in FIG. 3) may include a key management application 1101 of a second external electronic device (e.g., the second external electronic device 1401 in FIG. 14), an NFC service 1103, a contactless front end (CLF) 1105, and a security module 1107 (e.g., the security module 330 in FIG. 3). The embodiment illustrated in FIG. 13 may be performed between the operation entities of the second external electronic device key management application 1101, the NFC service 1103, the contactless front end (CLF) 1105, and the security module 1107.

According to various embodiments of the disclosure, the NFC service 1103 may denote a control circuit included in a communication module (e.g., the communication module 320 in FIG. 3). The CLF 1105 may denote a front-end circuit including an antenna performing NFC communication.

In operation 1301, the security module 1107 may transmit a signal (EVT_TRANSACION), indicating that sharing of the shared key is completed, to the second external electronic device key management application 1101.

The second external electronic device key management application 1101 may transmit, to the security module 1107, a command (DISABLE READER GATE CMD) to disable a reader gate in operation 1303, and the security module 1107 may transmit, to the second external electronic device key management application 1101, a response signal (DISABLE READER GATE RSP) to the command to disable the reader gate in operation 1305.

In operation 1307, the security module 1107 may transmit a signal (EVT_END_OPERATION) for terminating the reader mode to the CLF 1105. In operation 1309, the CLF 1105 may transmit a signal (READER_MODE_NTF), indicating that the reader mode has been terminated, to the NFC service 1103.

In operation 1311, the second external electronic device key management application 1101 may transmit a signal to disable the dedicated reader mode to the NFC service 1103.

In operation 1313, the NFC service 1103 may transmit a command (READER_MODE_CMD) to terminate the reader mode to the CLF 1105, and the CLF 1105 may terminate the reader mode. In operation 1315, the CLF 1105 may transmit a response message (READER_MODE_RSP) indicating that the reader mode has been terminated to the NFC service 1103.

In operation 1317, the NFC service 1103 may transmit a signal (RF_DISCOVERY_CMD), indicating an instruction to operate in a normal mode, to the CLF 1105. In operation 1319, the CLF 1105 may operate in a normal mode. For example, an RF discovery process may be performed. In operation 1321, the CLF 1105 may transmit a response message (RF_DISCOVERY_RSP) indicating operation in the normal mode to the NFC service.

In operation 1323, the NFC service 1103 may transmit a message indicating operation in the normal mode to the second external electronic device key management application 1101.

According to various embodiments of the disclosure, the normal mode may denote a mode that supports both a listening mode capable of receiving a signal transmitted by another external electronic device and a polling mode for broadcasting a signal for another external electronic device to recognize the existence of the first external electronic device 400 in order to establish a communication channel.

According to various embodiments of the disclosure, although the embodiments disclosed in FIGS. 11 and 13 are illustrated such that operations thereof are performed sequentially, the respective operations may be performed simultaneously (e.g., operation 1303 and operation 1311 may be performed at the same time, or some operations may precede other operations, instead of the operations being performing sequentially.

According to various embodiments of the disclosure, although the embodiments disclosed in FIGS. 11 and 13 are intended to be performed by the electronic device 300, the switching of the first external electronic device 400 between the modes may also be implemented using the operations illustrated in FIGS. 11 and 13.

FIG. 14 is a diagram illustrating an embodiment in which a second external electronic device 1401 verifies the validity of a shared key transmitted from a first external electronic device 400.

According to various embodiments of the disclosure, the first external electronic device (e.g., the electronic device 400 in FIG. 4) may receive a shared key and information related to the shared key from the electronic device (e.g., the electronic device 300 in FIG. 3). The information related to the shared key may include information indicating the status of the shared key. Statuses of the shared key may include the status in which the shared key is not received (e.g., index 1 in Table 1), the status in which the shared key has been received but the second external electronic device 1401 has not yet granted authority (e.g., index 2 in Table 1), the status in which the shared key has been received and the second external electronic device 1401 has granted authority (e.g., index 3 in Table 1), and the status in which the shared key is not valid (e.g., index 4 in Table 1).

According to various embodiments of the disclosure, in the case where the first external electronic device 400 receives a shared key, the status of the shared key may correspond to the status in which the shared key has been received but the second external electronic device 1401 has not yet granted authority (index 2). The shared key may switch to the status (index 3) indicating that the second external electronic device has granted authority, according to the result of verification by the second external electronic device 1401, which is performed during a first connection between the first external electronic device 400 and the second external electronic device 1401 after receiving the shared key. Hereinafter, an embodiment in which the second external electronic device verifies the shared key received by the first external electronic device 400 will be described.

In operation 1411, the first external electronic device 400 and the second external electronic device 1401 may establish a communication channel therebetween.

According to various embodiments of the disclosure, the first external electronic device 400 and the second external electronic device 1401 may establish a communication channel using a short-range communication method. If a short-range communication module included in the second external electronic device 1401 operates in a reader mode, and if the first external electronic device 400 approaches (or taps) the second external electronic device 1401, a communication channel may be established between the first external electronic device 400 and the second external electronic device 1401.

In operation 1413, the first external electronic device 400 may transmit a shared key and information related to the shared key to the second external electronic device 1401.

In operation 1415, the second external electronic device 1401 may perform verification of the shared key transmitted from the first external electronic device 400.

According to various embodiments of the disclosure, if the authentication key stored in the electronic device 300 is a master key, the first external electronic device 400 may receive a shared key generated based on the master key from the electronic device 300. In this case, the second external electronic device 1401 may verify the validity of the shared key based on the result of identifying whether or not the shared key is generated based on the master key.

According to various embodiments of the disclosure, if the authentication key stored in the electronic device 300 is a primary shared key generated based on the master key, the first external electronic device 400 may receive a token generated based on the primary shared key from the electronic device 300. The first external electronic device 400 may transmit the token received from the electronic device 300 to the second external electronic device 1401. In this case, the second external electronic device 1401 may verify the validity of the token based on the result of identifying whether or not the token is generated based on the primary shared key.

In operation 1417, the second external electronic device 1401 may register the shared key and the information related to the shared key, based on the result of verification of the shared key or token.

According to various embodiments of the disclosure, if the authentication key stored in the electronic device 300 is a master key, the first external electronic device 400 may receive a primary shared key and information related to the shared key from the electronic device 300. In this case, the second external electronic device 1401 may verify the validity, based on the result of identifying the primary shared key, and if the shared key is valid, may register the primary shared key and the information related to the shared key for a new user.

According to various embodiments of the disclosure, the security module 430 may be a module that is physically separate from the processor 410 or the memory 440 (e.g., the memory 130 in FIG. 1), and may encrypt and store data that is stored in the security module 430. According to another embodiment of the disclosure, the security module 430 may be included in an area of the memory 440, and the security module 430 may refer to a portion in which data stored in the memory 440 is encrypted and stored. In response to reception of a request for accessing data in the security module 430, the security module 430 may verify the access authority of an entity (e.g., various applications installed in the memory 440 or the like) that requests access to the data or integrity thereof, and may permit access to/editing of the data stored in the security module 430, or may transmit the stored data according to the result of the verification.

According to various embodiments of the disclosure, the security module 430 may include a contactless register service (CRS) for managing a key applet of the second external electronic device 1401 used in an operation in which the first external electronic device 400 performs authentication with the second external electronic device 1401. The CRS (not shown) may perform modification, addition, or deletion of data assigned to an applet, based on a user request.

According to various embodiments of the disclosure, the security module 430 may include a proximity vehicle key system environment (PVKSE). The PVKSE (e.g., the PVKSE 510 in FIG. 5) may monitor modification, addition, or deletion of data assigned to a key managing applet installed in the security module 430, and if a change in the data related to a vehicle key applet is detected, may produce information related to the vehicle key applet, or may change the produced information related to the applet. The PVKSE 510 may refer to an element implemented in software separately from the contactless registry service (CRS) for managing data stored in the security module 430. The detailed operation of receiving a shared key using the PVKSE 510 and the CRS 520 will be described with reference to FIG. 5.

According to various embodiments of the disclosure, the key sharing applet 431 installed in the security module 430 may receive a shared key installed in the security module 330 of the electronic device 300 and information related to the shared key through mutual operations with the key sharing applet 333 installed in the security module 330 of the electronic device 300.

According to various embodiments of the disclosure, the shared key received using the key sharing applet 431 may be activated when the second external electronic device 1401 and the first external electronic device 400 are connected to each other for the first time after receiving the shared key. The second external electronic device 1401 may verify the shared key that is transmitted when the first external electronic device 400 is connected, and may determine whether or not to activate the shared key, based on the verification result. The shared key before activation may remain at status 2 in Table 1 (PRIVILEGE DEACTIVE), and the shared key after activation may be changed to status 3 in Table 1 (PRIVILEGE ACTIVE).

According to various embodiments of the disclosure, if a token for generating a secondary shared key is received, the key sharing applet 431 may transmit the token for generating a secondary shared key to the second external electronic device 1401. The second external electronic device 1401 may identify whether or not the token for generating a secondary shared key is generated based on the primary shared key stored in the electronic device 300, thereby verifying the validity of the token for generating a secondary shared key, and may generate a secondary shared key. The generated shared key may be transmitted to the key sharing applet 431. The mutual operation between the second external electronic device 1401 and the first external electronic device 400 will be described later with reference to FIG. 14.

FIG. 5 is a block diagram illustrating a security module 330 in an electronic device (e.g., the electronic device 300 in FIG. 3) according to various embodiments of the disclosure.

Referring to FIG. 5, the security module 330 of the electronic device 300 according to various embodiments of the disclosure may be divided into an issued security domain (ISD) 581 and a supplementary security domain (SSD) 582.

According to various embodiments of the disclosure, a PVKSE 510 and a CRS 520 may be provided in the ISD 581. The PVKSE 510 may refer to a software element capable of managing data related to at least one key managing applet 530, 540, 550, 560, or 570 of the second external electronic device 1401, which is installed in the SSD 582. The PVKSE 510 may monitor a change in data related to at least one key managing applet 530, 540, 550, 560, or 570 of the second external electronic device 1401, and if a change is detected, may produce information related to an applet by reflecting the change in data or change the same.

According to various embodiments of the disclosure, the PVKSE 510 may manage information related to at least one key managing applet 530, 540, 550, 560, or 570 of the second external electronic device 1401. The information related to the applet may include an applet identification indicating an identifier of the manufacturer of the second external electronic device 1401, an applet label indicating the model of the second external electronic device 1401, priority information indicating the priority of the applet, and applet-specific data.

According to various embodiments of the disclosure, the security module 330 may include a CRS 520 for managing at least one vehicle key managing applet 530, 540, 550, 560, or 570, and may perform management of at least one applet 530, 540, 550, 560, or 570 under the control of the CRS 520.

According to various embodiments of the disclosure, the CRS 520 may refer to a software element for managing files, which is installed in the security module 330. The CRS 520 may perform management of a variety of data (e.g., encryption of data, decryption of encrypted data, etc.) stored in the security module 330, based on a request of the processor (e.g., the processor 310 in FIG. 3), and may move data stored in the security module 330 to the memory (e.g., the memory 350 in FIG. 3).

According to various embodiments of the disclosure, the PVKSE 510 of the security module 330 may produce an AID list that includes applet identifications (AIDs) of the respective vehicle key applets stored in the security module 330. The AID list may be produced and managed by the PVKSE 510.

The electronic device (e.g., the electronic device 300 in FIG. 3) may make a request to the first external electronic device 400 for transmitting the AID list stored in the security module 430 of the first external electronic device 400 in order to transmit a shared key to the first external electronic device 400. For example, the transmission of the AID list stored in the security module 430 of the first external electronic device 400 may be performed using an instruction defined as SELECT PVKSE. The PVKSE 510 may produce and transmit an AID list in response to reception of an instruction defined as SELECT PVKSE.

According to various embodiments of the disclosure, the PVKSE 510 may transmit the AID list to the electronic device 300 in response to a request from the electronic device 300. The key sharing applet 333 of the electronic device 300 may receive an AID list from the first external electronic device 400, and may identify whether or not an AID corresponding to the shared key is included in the AID list. If an AID corresponding to the shared key is included in the received AID list, the key sharing applet 333 may perform an operation of transmitting AID information corresponding to the shared key to the first external electronic device 400.

According to various embodiments of the disclosure, the PVKSE 510 may receive selected AID information transmitted from the key sharing applet 333, and may transmit information related to the applet corresponding to the selected AID {e.g., information related to the second external electronic device 1401 and information on the key sharing applet 431 (the version of the key sharing applet)}.

According to various embodiments of the disclosure, each of the one or more applets 530, 540, 550, 560, and 570 may be stored in the SSD 582. The SSD 582 may be divided into spaces for respective manufacturers of second external electronic devices 1401, and applets corresponding to respective manufacturers may be stored in the corresponding spaces of the SSD 582 divided for the respective manufacturers. For example, the applets 550 and 560 corresponding to manufacturer 1 may be stored in an SSD space 584 corresponding to manufacturer 1, and the applet 570 corresponding to manufacturer 2 may be stored in an SSD space 585 corresponding to manufacturer 2. The SSD 582 may further include an SSD space 583 for separately storing applets 530 and 540 for the shared key for the second external electronic device 1401 that may be shared by various users (e.g., a vehicle that is the target to be shared in the case of car sharing).

According to various embodiments of the disclosure, each of the one or more applets 530, 540, 550, 560, and 570 may include data indicating whether or not the applet is activated. The activated applet may denote an applet capable of performing authentication of the electronic device 300 with the second external electronic device 1401, and the deactivated applet may denote an applet that is unable to perform authentication of the electronic device 300 with the second external electronic device 1401.

According to various embodiments of the disclosure, although FIG. 5 is illustrated based on the embodiment of the security module 330 of the electronic device 300, if the first external electronic device 400 receives a key transmitted by the electronic device 300, the security module 430 of the first external electronic device 400 may store the key transmitted by the electronic device 300 in the same manner as the embodiment described with reference to FIG. 5.

An electronic device (e.g., the electronic device 300 in FIG. 3) according to various embodiments of the disclosure may include: a processor (e.g., the processor 310 in FIG. 3); at least one communication module (e.g., the communication module 320 in FIG. 3) configured to support wireless communication; and a security module (e.g., the security module 330 in FIG. 3) having an applet installed therein so as to store and manage a shared key to be transmitted to a first external electronic device (e.g., the first external electronic device 400 in FIG. 4) and an authentication key used in authentication with a second external electronic device, wherein the processor 310 may be configured to receive, from the first external electronic device 400, a request for transmitting the authentication key to the first external electronic device, transmit information for generating the shared key and a command to generate the shared key to the security module 330, control the security module 330 so as to generate the shared key, based on the information for generating the shared key, and control the security module 330 so as to transmit the generated shared key and information related to the generated shared key to the first external electronic device 400.

According to various embodiments of the disclosure, the information related to the shared key may include information indicating generation based on the authentication key.

According to various embodiments of the disclosure, the information related to the shared key may include information indicating an instruction to activate at least some of the functions provided by the second external electronic device (e.g., the second external electronic device 1401 in FIG. 14).

According to various embodiments of the disclosure, the input information for generating the shared key may include an available usage time of the second external electronic device 1401 and geofencing limitation data of the second external electronic device 1401.

According to various embodiments of the disclosure, the processor 310 may be configured to transmit, to the security module 330, an encryption key for encryption of the shared key along with the information for generating the shared key.

According to various embodiments of the disclosure, the security module 330 may be configured to receive information related to the applet (e.g., the key sharing applet 431 in FIG. 4) for managing the shared key, which is installed in the security module (e.g., the security module 430 in FIG. 4) of the first external electronic device 400, and determine whether or not to transmit the shared key to the first external electronic device 400, based on the received information related to the applet.

According to various embodiments of the disclosure, the security module 330 is configured to identify whether or not an applet identification included in the information related to the applet is the same as an identifier corresponding to the shared key, and determine whether or not to transmit the shared key to the first external electronic device 400, based on whether or not the applet identification is the same as the identifier corresponding to the shared key.

According to various embodiments of the disclosure, the information related to the applet may include at least one of the address at which the applet is stored, an applet identification, a model identifier of the first external electronic device 400, data indicating whether or not to activate the applet, a priority assigned to each applet, or applet-specific data.

According to various embodiments of the disclosure, the authentication key may be one of either a master key or a key generated based on the master key, and if the authentication key is the key generated based on the master key, the security module 330 may be configured to generate a token indicating that the shared key is generated based on the authentication key and transmit the token and information related to the shared key to the first external electronic device 400.

According to various embodiments of the disclosure, the electronic device 300 may be configured to transmit the shared key and the information related to the shared key to the first external electronic device 400 using the communication module 320.

An electronic device (e.g., the first external electronic device 400 in FIG. 4) according to various embodiments of the disclosure may include: a processor (e.g., the processor 410 in FIG. 4); at least one communication module (e.g., the communication module 420 in FIG. 4) configured to support wireless communication; and a security module 430 configured to manage information related to an applet that manages an authentication key used in authentication of a second external electronic device (e.g., the second external electronic device 1401 in FIG. 14) and store an applet identification (AID) list and the applet, wherein the security module 430 may be configured to receive a signal requesting the information related to the applet from the first external electronic device (e.g., the electronic device 300 in FIG. 3), transmit the information related to the applet to the first external electronic device 300, receive the shared key and information related to the shared key from the first external electronic device 300, and install the received shared key and the information related to the shared key in the security module 430.

According to various embodiments of the disclosure, the processor 420 may be configured to receive information on the second external electronic device 1401 from the first external electronic device 300, identify an applet identification for management of the shared key, based on the information on the second external electronic device 1401, and transmit a command to install the applet to the security module 430.

According to various embodiments of the disclosure, the security module 430 may be configured to, if there is a plurality of applets installed in the security module, deactivate the remaining applets, excluding applets for managing the shared key, and, in response to completion of installation of the shared key, activate the remaining applets.

According to various embodiments of the disclosure, the security module 430 may include a proximity vehicle key system environment (PVKSE) (e.g., the PVKSE 510 in FIG. 5) configured to manage information related to the applet, and the PVKSE 510 may be stored in an issued security domain (e.g., the ISD 581 in FIG. 5) of the security module, and the applet may be stored in a supplementary security domain (e.g., the SSD 582 in FIG. 5).

According to various embodiments of the disclosure, the information related to the shared key may be stored in the first external electronic device 300, and may include information indicating generation based on an authentication key used in authentication of the second external electronic device 1401.

According to various embodiments of the disclosure, the authentication key stored in the first external electronic device 300 may be one of either a master key or a key generated based on the master key, and, if the authentication key is a key generated based on the master key, the security module 430 may be configured to receive a token indicating that the shared key is generated based on the authentication key from the first external electronic device 300, transmit the token to the second external electronic device 1401, and receive a shared key generated based on the token by the second external electronic device 1401.

FIG. 6 is an operational flowchart of an operating method of an electronic device according to various embodiments of the disclosure. FIG. 6 describes a detailed operation of generating a shared key and sharing the generated shared key between an electronic device (e.g., the electronic device 300 in FIG. 3) and a first external electronic device (e.g., the first external electronic device 400 in FIG. 4).

Referring to FIG. 6, in operation 610, the electronic device 300 may generate a shared key in a security module (e.g., the security module 330 in FIG. 3). The operation of generating the shared key may be performed by a vehicle key applet (e.g., the key managing applet 331 in FIG. 3) installed in the security module 330. The shared key generated by the key managing applet 331 may be transmitted to a key sharing applet (e.g., the key sharing applet 333 in FIG. 3) installed in the security module 330 in order to transmit the same to the first external electronic device 400. A detailed operation of generation of the shared key will be described later with reference to FIG. 7.

In operation 620, the first external electronic device 400 may install a key sharing applet (e.g., the key sharing applet 431 in FIG. 4) for receiving a shared key in the security module (e.g., the security module 430 in FIG. 4). A detailed operation of installing the key sharing applet 431 will be described later with reference to FIG. 9.

In operation 630, the electronic device 300 and the first external electronic device 400 may transmit/receive the shared key generated in operation 610. A process of sharing the shared key may be performed between the key sharing applet 333 installed in the security module 330 of the electronic device 300 and the key sharing applet 431 installed in the security module 430 of the first external electronic device 400. A detailed operation of transmitting/receiving the shared key will be described later with reference to in FIGS. 10 to 13.

FIG. 7 is an operational flowchart illustrating a method of generating a shared key used for authentication of a second external electronic device in an electronic device and an operating method of an electronic device according to various embodiments of the disclosure.

FIG. 7 illustrates a detailed description of the operation of generating a shared key (operation 610) described in FIG. 6.

Referring to FIG. 7, in operation 710, the processor 310 of the electronic device (e.g., the electronic device 300 in FIG. 3) may execute a key management application of the second external electronic device (e.g., the second external electronic device 1401 in FIG. 14) in response to a user input. The key management application of the second external electronic device 1401 is an application installed in the memory (e.g., the memory 340 in FIG. 3), and may control a vehicle key managing applet stored in the security module (e.g., the security module 330 in FIG. 3).

According to various embodiments of the disclosure, the processor 310 may receive a signal requesting transmission of an authentication key used for authentication of the electronic device 300 with a vehicle to the first external electronic device 400. For example, the user of the electronic device 300 may make a request for transmitting an authentication key to the first external electronic device 400 using a user interface of the key management application of a vehicle.

In operation 720, the processor 310 may receive a user input including information for generating a shared key. According to various embodiments of the disclosure, the processor 310 may receive a user input of entering information for generating a shared key using a user interface provided by the key management application of the second external electronic device.

According to various embodiments of the disclosure, the information for generating a shared key may include the name of the user of the first external electronic device 400 and information on functions to be activated among the functions provided by the second external electronic device 1401. The functions provided by the second external electronic device 1401 may include an available usage time of the second external electronic device 1401 (for example, in the case where the second external electronic device 1401 is a vehicle, the time during which driving of the vehicle is allowed), geofencing limitation data of the second external electronic device 1401 (for example, in the case where the second external electronic device 1401 is a vehicle, the geographic range in which driving of the vehicle is allowed), performance limits of the second external electronic device 1401 (for example, in the case where the second external electronic device 1401 is a vehicle, the maximum permissible speed thereof), and information indicating whether or not use of various devices included in the second external electronic device 1401 (for example, in the case where the second external electronic device 1401 is a vehicle, the various devices may be a trunk, a console box, and the like) or various functions available to the second external electronic device 1401 (for example, in the case where the second external electronic device 1401 is a vehicle, lane maintenance assistance, lane departure notification, cruise control, adaptive cruise control, or engine availability) is permitted. The information for generating a shared key may be produced by a user input (the name of the user of the first external electronic device 400 and a user input for selecting an activated function from among the functions provided by the second external electronic device 1401) from the user of the electronic device 300 using a user interface of the key management application of the second external electronic device 1401.

According to various embodiments of the disclosure, the information for generating a shared key may include data required for encrypting the generated shared key and transmitting the same to the first external electronic device 400. For example, the information for generating a shared key may include an encryption key required for encryption of the generated shared key using a symmetric encryption method or an asymmetric encryption method.

According to various embodiments of the disclosure, an authentication operation for the electronic device 300 to perform operation 730 may be added subsequent to operation 720. If user authentication is successful, the processor 310 may transmit the information for generating a shared key and a command to generate a shared key to the security module 330. The user authentication may be performed by various methods {for example, the methods may include a method of entering a pin number and a method of inputting a user's biometric information (e.g., fingerprint input, iris recognition, or face recognition)}.

In operation 730, the processor 310 may transmit the information for generating a shared key and the shared key generation instruction to the security module 330.

According to various embodiments of the disclosure, the generation of a shared key may be performed by the key managing applet 331 installed in the security module 330. The key managing applet 331 may generate a shared key using the information for generating a shared key.

In operation 740, the key managing applet 331 may generate a shared key and information related to the shared key, based on the information for generating a shared key.

According to various embodiments of the disclosure, the shared key may refer to a key required to perform authentication with the second external electronic device 1401 in order for the first external electronic device 400 to activate various functions of the second external electronic device 1401.

According to various embodiments of the disclosure, the information related to the shared key may include information indicating that the shared key is generated based on the authentication key stored in the electronic device 300. The second external electronic device 1401 may receive the information related to the shared key from the first external electronic device 400, and may verify whether or not the shared key is valid based on the information indicating that the shared key is generated based on the authentication key stored in the electronic device 300.

FIG. 8 is an operational flowchart illustrating a method of storing a shared key generated by a key managing applet 331 in a key sharing applet 333 of a security module 330 in an electronic device and an operating method of an electronic device according to various embodiments of the disclosure.

According to various embodiments of the disclosure, if the key managing applet 331 of the electronic device 300 supports SE2SE (a communication standard for transmitting data from a security module to another security module), the key managing applet 331 may directly transmit a shared key and information related to the shared key to the key sharing applet 431 of the first external electronic device 400, instead of using the key sharing applet 333. In this case, the operation illustrated in FIG. 8 may be omitted.

In operation 810, in response to receiving, from the key managing applet 331, a signal indicating that generation of the shared key is successful, the key management application of the second external electronic device 1401 of the electronic device 300 may transmit, to a key sharing application of the electronic device 300, a signal indicating that the shared key generation operation is successful. For example, the key sharing application may denote an application that is installed in the memory (e.g., the memory 340 in FIG. 3) of the electronic device 300 and manages the operation of the key sharing applet 333 installed in the security module 330.

In operation 820, the key sharing application may transmit a command to receive a shared key to the key sharing applet 333 installed in the security module 330.

According to various embodiments of the disclosure, the key sharing application may transmit a command to receive a shared key to the key sharing applet 333 that matches the AID corresponding to the shared key.

In operation 830, in response to receiving the command to receive the shared key transmitted by the key sharing application, the key sharing applet 333 may receive the shared key and shared key-related information transmitted by the key managing applet 331. According to an embodiment, the key sharing applet 333 may make a request for the shared key and the shared key-related information to the key managing applet 331. For example, in response to receiving the request for the shared key and the shared key-related information transmitted from the key sharing applet 333, the key managing applet 331 may transmit the shared key and the shared key-related information to the key sharing applet 333.

In operation 840, the key sharing applet 333 may transmit, to the key sharing application, information indicating that the reception of the shared key and the shared key-related information was successful.

FIG. 9 is an operational flowchart illustrating a method (operation 620) of installing an applet for receiving a shared key in a first external electronic device 400 according to various embodiments of the disclosure.

Referring to FIG. 9, in operation 910, the processor (e.g., the processor 410 in FIG. 4) may perform a key sharing application. The key sharing application may be installed in the memory (e.g., the memory 440 in FIG. 1) of the first external electronic device 400, and may refer to an application for installing a key sharing applet (e.g., the key sharing applet 431 in FIG. 4) for receiving a shared key and information related to the shared key from the electronic device (e.g., the electronic device 300 in FIG. 3). For example, the key sharing application may provide and change the status of priority of the installed shared key, the activation or deactivation status thereof, and information on available functions of a vehicle.

In operation 920, the processor 410 may receive a user input for information related to the second external electronic device (e.g., the second external electronic device 1401 in FIG. 14). The information related to the second external electronic device 1401 may denote the information entered by the user of the first external electronic device 400 using an interface of the key sharing application. The information related to the second external electronic device 1401 may include the name of the manufacturer (e.g., BMX) of the second external electronic device 1401 and the model name (e.g., X5) of the second external electronic device 1401.

According to various embodiments of the disclosure, the processor 410 may receive information related to the type of shared key, which is input by the user of the first external electronic device 400 using an interface of the key sharing application. The information related to the type of shared key may denote information indicating one of either a shared key that is the same as the key of the second external electronic device 1401 stored in the electronic device 300 or a normal shared key for sharing a car used by a plurality of users.

In operation 930, the processor 410 may transmit, to the security module 430, the received information related to the second external electronic device 1401 or the information related to the type of shared key and a command to install the key sharing applet 431.

According to various embodiments of the disclosure, an authentication operation of the first external electronic device 400 to perform operation 940 may be added subsequent to operation 930. If user authentication is successful, the processor 410 may transmit a command to install the key sharing applet 431 to the security module 430. The user authentication may be performed by various methods {for example, the methods may include a method of entering a pin number and a method of inputting a user's biometric information (e.g., fingerprint input, iris recognition, or face recognition)}.

In operation 940, the security module 430 may install the key sharing applet 431 corresponding to the identifier (AID) of the manufacture of the second external electronic device 1401, which is included in the information related to the second external electronic device 1401.

According to various embodiments of the disclosure, the generated key sharing applet 431 may include user information, information on the second external electronic device 1401, and information on a plurality of encryption keys used for encryption in transmission and reception between the second external electronic device 1401 and the first external electronic device 400. The key sharing applet 431 may include information indicating the status of the received shared key, and the status of the received shared key is defined in Table 1 below.

According to various embodiments of the disclosure, the key sharing applet 431 may transmit the identifier of the manufacturer to the key sharing applet 333 of the electronic device 300 in order to receive a shared key corresponding to the identifier of the manufacturer of a vehicle. If the shared key stored in the electronic device 300 does not correspond to the identifier of the manufacturer, the operation of transmitting/receiving the shared key may be terminated.

FIG. 10 is an operational flowchart illustrating a detailed method of transmitting/receiving a shared key in an electronic device and an operating method of an electronic device according to various embodiments of the disclosure.

Referring to FIG. 10, in operation 1001, an electronic device (e.g., the electronic device 300 in FIG. 3) may enter a shared key transmission mode to transmit a shared key to the first external electronic device (e.g., the first external electronic device 400 in FIG. 4). In the case where the shared key is transmitted/received using short-range communication (e.g., NFC), the electronic device 300 may operate in an NFC reader mode. The shared key transmission mode may include a detailed operation of switching the communication module 320 of the electronic device 300 to an NFC reader mode. The electronic device 300 may enter the shared key transmission mode, and may transmit a signal making a request for transmitting an AID list to the first external electronic device 400. A detailed operation of entering the shared key transmission mode will be described later with reference to FIG. 11.

In operation 1003, the first external electronic device 400 may enter a shared key reception mode for receiving a shared key transmitted by the electronic device 300. In the case where a shared key is transmitted/received using short-range communication (e.g., NFC), the first external electronic device 400 may receive a shared key while operating in an NFC card mode.

In operation 1005, the electronic device 300 and the first external electronic device 400 may share the shared key using a secure-module-to-secure-module (SE2SE) reader/card emulation mode. The electronic device 300 may operate in the NFC reader mode, and the first external electronic device 400 may operate in the NFC card mode. Details of operation 1005 will be described later with reference to FIG. 12.

In operation 1007, the electronic device 300, having transmitted the shared key, may enter a normal mode from the shared key transmission mode. The normal mode may denote a mode that supports both a listening mode capable of receiving a signal transmitted by another external electronic device and a polling mode for broadcasting a signal for another external electronic device to recognize the existence of the electronic device 300 in order to establish a communication channel. Details of operation 1007 will be described later with reference to FIG. 13.

In operation 1009, the first external electronic device 400, having received the shared key, may enter a normal mode from the shared key reception mode. The normal mode may denote a mode that supports both a listening mode capable of receiving a signal transmitted by another external electronic device and a polling mode for broadcasting a signal for another external electronic device to recognize the existence of the first external electronic device 400 in order to establish a communication channel.

In operation 1011, the electronic device 300 may receive a notification indicating a result of sharing the shared key (failure or success), and may update history information of the key management application of the second external electronic device using the result of sharing the shared key.

According to various embodiments of the disclosure, the electronic device 300 may provide information such that the user of the electronic device 300 may recognize the result of sharing the shared key. For example, the information may be provided to the user through a display device (e.g., the display device 160 in FIG. 1) of the first electronic device 300 or a sound output device (e.g., the sound output device 155 in FIG. 1) thereof.

In operation 1013, the first external electronic device 400 may receive a notification indicating the result of sharing the shared key (failure or success), and may output the sharing result such that the user of the first external electronic device 400 may recognize the same. For example, information may be provided to the user through a display device (e.g., the display device 160 in FIG. 1) of the first external electronic device 400 or a sound output device (e.g., the sound output device 155 in FIG. 1) thereof.

According to various embodiments of the disclosure, the shared key stored in the first external electronic device 400, having successfully received the shared key, may still be in an inactive state. For example, the shared key may be activated after verifying the shared key of the second external electronic device 1401 upon establishing a communication connection with the second external electronic device 1401.

FIG. 11 is a diagram illustrating a transmission mode in which an electronic device transmitting a shared key transmits a shared key. The embodiment illustrated in FIG. 11 is a description of the embodiment of entering the mode for transmitting a shared key (operation 1001) in the embodiment illustrated in FIG. 10. Referring to FIG. 11, according to various embodiments of the disclosure, an electronic device (e.g., the electronic device 300 in FIG. 3) may include a key management application or a key sharing application 1101 of the second external electronic device, an NFC service 1103, a contactless front end (CLF) 1105, and a security module 1107 (e.g., the security module 330 in FIG. 3). The embodiment illustrated in FIG. 11 may be performed between the operation entities of the electronic device (e.g., the electronic device 300 in FIG. 3), that is, the second external electronic device key management application 1101, the NFC service 1103, the contactless front end (CLF) 1105, and the security module 1107.

According to various embodiments of the disclosure, the NFC service 1103 may denote a control circuit included in a communication module (e.g., the communication module 320 in FIG. 3). The CLF 1105 may denote a front-end circuit that includes an antenna for performing NFC communication.

In operation 1109, the key management application or key sharing application 1101 of the second external electronic device may perform control to configure the NFC service 1103 in a specified NFC reader mode. The NFC service 1103 may perform control such that the CLF 1105 operates in an NFC reader mode in response to reception of a signal transmitted from the key management application or key sharing application 1101 of the second external electronic device.

In operation 1111, the NFC service 1103 may transmit a command (RF_DEACTIVATE_CMD) to deactivate the CLF 1105 to the CLF 1105.

According to various embodiments of the disclosure, the CLF 1105 may deactivate a previously performed mode, and may operate in an NFC reader mode. In operation 1113, the CLF 1105 may transmit, to the NFC service 1103, a response signal (RF_DEACTIVATE_RSP) to the deactivation command.

In operation 1115, the NFC service 1103 may transmit a signal (SELECT_HOST_CMD) for selecting a host (the security module) to the CLF 1105. For example, the host may denote an entity for receiving the received data or an entity having data to be transmitted. In this embodiment, since the shared key exists in the security module 1107, the host may correspond to the security module 1107. In operation 1117, the CLF 1105 may transmit, to the NFC service 1103, a response signal (SELECT_HOST_RSP) to the host selection signal transmitted in operation 1115.

In operation 1119, the NFC service 1103 may transmit a command (READER_MODE_CMD) to activate a reader mode to the CLF 1105. In operation 1121, the CLF 1105 may transmit, to the NFC service 1103, a response signal (READER_MODE_RSP) to the command to activate the reader mode. In operation 1123, the NFC service 1103 may transmit a result to the second external electronic device key management application or key sharing application 1101.

In operation 1125, the second external electronic device key management application or key sharing application 1101 may transmit a command (SELECT AID APDU CMD) to select an AID to the security module 1107. In operation 1127, the security module 1107 may transmit a response signal (SELECT AID APDU RSP) to the command to select the AID to the second external electronic device key management application or key sharing application 1101.

In operation 1129, the second external electronic device key management application or key sharing application 1101 may transmit a command (ENABLE READER GATE CMD) to enable a reader gate to the security module 1107. The command to activate the reader gate may indicate an operation in which the security module 1107 prepares to transmit a shared key and shared key-related data. In operation 1131, the security module 1107 may transmit a response signal (ENABLE READER GATE RSP) to the command to enable the reader gate to the second external electronic device key management application 1101.

In operation 1133, the security module 1107 may transmit, to the CLF 1105, a signal making a request (EVT_READER_REQUESTED) for operating in a reader mode. In operation 1135, the CLF 1105 may transmit, to the NFC service 1103, a signal making a request (READER_MODE_NTF) for operating in the reader mode, which is transmitted from the security module 1107.

In operation 1137, the NFC service 1103 may transmit a command (READER_MODE_CMD) to operate in the reader mode to the CLF 1105. The CLF 1105 may transmit, to the NFC service 1103, a response signal (READER_MODE_RSP) to the command to operate in the reader mode in operation 1139, and the CLF 1105 may enter a shared key transmission mode in operation 1141. The shared key transmission mode may indicate a mode supporting a polling mode in which a signal is broadcast in order for the first external electronic device 400 to recognize the existence of the electronic device 300.

FIG. 12 is a flowchart illustrating an operation of transmitting/receiving a shared key in an electronic device and an operating method of an electronic device according to various embodiments of the disclosure. The embodiment illustrated in FIG. 12 relates to the operation (operation 1005) of sharing the shared key in the embodiment illustrated in FIG. 10.

The embodiment illustrated in FIG. 12 relates to an operation (e.g., operation 1005 in FIG. 10) of transmitting and receiving a shared key and information related to the shared key between the electronic device (e.g., the electronic device 300 in FIG. 3) and the first external electronic device (e.g., the electronic device 400 in FIG. 4).

Referring to FIG. 12, according to an embodiment, the electronic device 300, transmitting a shared key and information related to the shared key, may operate in a reader mode, and the first external electronic device 400, receiving a shared key and information related to the shared key, may operate in a card mode.

The data transmitted and received by the electronic device 300 and the first external electronic device 400 may follow the data standard defined as a single application protocol data unit (APDU). The data transmitted while the electronic device 300 transmits a command to the first external electronic device 400 may be defined as a command-application protocol data unit (C-APDU), and the data transmitted while the first external electronic device 400 responds to the electronic device 300 may be defined as a response-application protocol data unit (R-APDU). According to various embodiments of the disclosure, the electronic device 300 and the first external electronic device 400 may perform the following operations using the data standards defined in the C-APDU and R-APDU formats.

First, the security module 330 of the electronic device 300 may make a request to the first external electronic device 400 for transmitting an AID list using the communication module 320. The security module 430 of the first external electronic device 400 may transmit an AID list to the electronic device 300 through the communication module 420.

The security module 330 of the electronic device 300 may select an AID corresponding to a shared key to be transmitted from the received AID list, and may make a request to the first external electronic device 400 for transmitting information indicating the selected AID and information related to a key sharing applet corresponding to the selected AID. The security module 430 of the first external electronic device 400 may transmit, to the electronic device 300, information related to the key sharing applet (e.g., information on the version of the key sharing applet and user information) through the communication module 420.

The security module 330 of the electronic device 300 may identify the information related to the key sharing applet, and may identify the status of the key sharing applet (the status defined in Table 1).

The security module 330 of the electronic device 300 and the security module 430 of the first external electronic device 400 may perform mutual authentication using an encryption key, and if the mutual authentication is completed, the security module 330 may transmit a generated shared key and information related to the shared key to the security module 430 of the first external electronic device 400 using the communication module 320.

The security module 430 of the first external electronic device 400 may receive the shared key and the information related to the shared key from the electronic device 300, and may change the status of the shared key included in the information related to the shared key to the inactive status.

According to various embodiments of the disclosure, the transmission and reception of data between the electronic device 300 and the first external electronic device 400 described above may be performed according to the data standards of the C-APDU and the R-APDU illustrated in operations 1201, 1203, 1205, and 1207.

FIG. 13 is a diagram illustrating an embodiment in which an electronic device transmitting a shared key switches from a transmission mode for transmitting a shared key to a normal mode.

Referring to FIG. 13, an embodiment in which an electronic device (e.g., the electronic device 300 in FIG. 3) switches to a normal mode after transmitting a shared key and information related to the shared key to a first external electronic device (e.g., the electronic device 400 in FIG. 4) is illustrated. The embodiment illustrated in FIG. 13 relates to the operation (operation 1007) of switching from the shared key transmission mode to the normal mode after the operation of sharing the shared key is completed in the embodiment illustrated in FIG. 10.

Referring to FIG. 13, according to various embodiments of the disclosure, the electronic device (e.g., the electronic device 300 in FIG. 3) may include a key management application 1101 of a second external electronic device (e.g., the second external electronic device 1401 in FIG. 14), an NFC service 1103, a contactless front end (CLF) 1105, and a security module 1107 (e.g., the security module 330 in FIG. 3). The embodiment illustrated in FIG. 13 may be performed between the operation entities of the second external electronic device key management application 1101, the NFC service 1103, the contactless front end (CLF) 1105, and the security module 1107.

According to various embodiments of the disclosure, the NFC service 1103 may denote a control circuit included in a communication module (e.g., the communication module 320 in FIG. 3). The CLF 1105 may denote a front-end circuit including an antenna performing NFC communication.

In operation 1301, the security module 1107 may transmit a signal (EVT_TRANSACION), indicating that sharing of the shared key is completed, to the second external electronic device key management application 1101.

The second external electronic device key management application 1101 may transmit, to the security module 1107, a command (DISABLE READER GATE CMD) to disable a reader gate in operation 1303, and the security module 1107 may transmit, to the second external electronic device key management application 1101, a response signal (DISABLE READER GATE RSP) to the command to disable the reader gate in operation 1305.

In operation 1307, the security module 1107 may transmit a signal (EVT_END_OPERATION) for terminating the reader mode to the CLF 1105. In operation 1309, the CLF 1105 may transmit a signal (READER_MODE_NTF), indicating that the reader mode has been terminated, to the NFC service 1103.

In operation 1311, the second external electronic device key management application 1101 may transmit a signal to disable the dedicated reader mode to the NFC service 1103.

In operation 1313, the NFC service 1103 may transmit a command (READER_MODE_CMD) to terminate the reader mode to the CLF 1105, and the CLF 1105 may terminate the reader mode. In operation 1315, the CLF 1105 may transmit a response message (READER_MODE_RSP) indicating that the reader mode has been terminated to the NFC service 1103.

In operation 1317, the NFC service 1103 may transmit a signal (RF_DISCOVERY_CMD), indicating an instruction to operate in a normal mode, to the CLF 1105. In operation 1319, the CLF 1105 may operate in a normal mode. For example, an RF discovery process may be performed. In operation 1321, the CLF 1105 may transmit a response message (RF_DISCOVERY_RSP) indicating operation in the normal mode to the NFC service.

In operation 1323, the NFC service 1103 may transmit a message indicating operation in the normal mode to the second external electronic device key management application 1101.

According to various embodiments of the disclosure, the normal mode may denote a mode that supports both a listening mode capable of receiving a signal transmitted by another external electronic device and a polling mode for broadcasting a signal for another external electronic device to recognize the existence of the first external electronic device 400 in order to establish a communication channel.

According to various embodiments of the disclosure, although the embodiments disclosed in FIGS. 11 and 13 are illustrated such that operations thereof are performed sequentially, the respective operations may be performed simultaneously (e.g., operation 1303 and operation 1311 may be performed at the same time, or some operations may precede other operations, instead of the operations being performing sequentially.

According to various embodiments of the disclosure, although the embodiments disclosed in FIGS. 11 and 13 are intended to be performed by the electronic device 300, the switching of the first external electronic device 400 between the modes may also be implemented using the operations illustrated in FIGS. 11 and 13.

FIG. 14 is a diagram illustrating an embodiment in which a second external electronic device 1401 verifies the validity of a shared key transmitted from a first external electronic device 400.

According to various embodiments of the disclosure, the first external electronic device (e.g., the electronic device 400 in FIG. 4) may receive a shared key and information related to the shared key from the electronic device (e.g., the electronic device 300 in FIG. 3). The information related to the shared key may include information indicating the status of the shared key. Statuses of the shared key may include the status in which the shared key is not received (e.g., index 1 in Table 1), the status in which the shared key has been received but the second external electronic device 1401 has not yet granted authority (e.g., index 2 in Table 1), the status in which the shared key has been received and the second external electronic device 1401 has granted authority (e.g., index 3 in Table 1), and the status in which the shared key is not valid (e.g., index 4 in Table 1).

According to various embodiments of the disclosure, in the case where the first external electronic device 400 receives a shared key, the status of the shared key may correspond to the status in which the shared key has been received but the second external electronic device 1401 has not yet granted authority (index 2). The shared key may switch to the status (index 3) indicating that the second external electronic device has granted authority, according to the result of verification by the second external electronic device 1401, which is performed during a first connection between the first external electronic device 400 and the second external electronic device 1401 after receiving the shared key. Hereinafter, an embodiment in which the second external electronic device verifies the shared key received by the first external electronic device 400 will be described.

In operation 1411, the first external electronic device 400 and the second external electronic device 1401 may establish a communication channel therebetween.

According to various embodiments of the disclosure, the first external electronic device 400 and the second external electronic device 1401 may establish a communication channel using a short-range communication method. If a short-range communication module included in the second external electronic device 1401 operates in a reader mode, and if the first external electronic device 400 approaches (or taps) the second external electronic device 1401, a communication channel may be established between the first external electronic device 400 and the second external electronic device 1401.

In operation 1413, the first external electronic device 400 may transmit a shared key and information related to the shared key to the second external electronic device 1401.

In operation 1415, the second external electronic device 1401 may perform verification of the shared key transmitted from the first external electronic device 400.

According to various embodiments of the disclosure, if the authentication key stored in the electronic device 300 is a master key, the first external electronic device 400 may receive a shared key generated based on the master key from the electronic device 300. In this case, the second external electronic device 1401 may verify the validity of the shared key based on the result of identifying whether or not the shared key is generated based on the master key.

According to various embodiments of the disclosure, if the authentication key stored in the electronic device 300 is a primary shared key generated based on the master key, the first external electronic device 400 may receive a token generated based on the primary shared key from the electronic device 300. The first external electronic device 400 may transmit the token received from the electronic device 300 to the second external electronic device 1401. In this case, the second external electronic device 1401 may verify the validity of the token based on the result of identifying whether or not the token is generated based on the primary shared key.

In operation 1417, the second external electronic device 1401 may register the shared key and the information related to the shared key, based on the result of verification of the shared key or token.

According to various embodiments of the disclosure, if the authentication key stored in the electronic device 300 is a master key, the first external electronic device 400 may receive a primary shared key and information related to the shared key from the electronic device 300. In this case, the second external electronic device 1401 may verify the validity, based on the result of identifying the primary shared key, and if the shared key is valid, may register the primary shared key and the information related to the shared key for a new user.

In operation 1419, the second external electronic device 1401 may transmit the result of verification of the shared key to the first external electronic device 400.

In operation 1421, the first external electronic device 400 may update information related to the shared key. According to various embodiments of the disclosure, the status of the shared key included in the information related to the shared key may be changed. More specifically, the status of the shared key included in the information related to the shared key may correspond to the status in which the shared key has been received but the second external electronic device 1401 has not yet granted authority (e.g., index 2 in Table 1). The first external electronic device 400 may change the status of the shared key to the status in which the shared key has been received and the second external electronic device 1401 has granted authority (e.g., index 3 in Table 1), based on the result of verification of the second external electronic device 1401.

An operating method of an electronic device (e.g., the electronic device 300 in FIG. 3) according to various embodiments of the disclosure may include: receiving, from a first external electronic device (e.g., the first external electronic device 400 in FIG. 4), a request for transmitting a shared key generated based on an authentication key used in authentication with a second external electronic device (e.g., the second external electronic device 1401 in FIG. 14); transmitting information for generating the shared key and a command to generate the shared key to the security module (e.g., the security module 330 in FIG. 3); controlling the security module 330 so as to generate the shared key, based on the information and the command; and controlling the security module 300 so as to transmit the generated shared key and information related to the generated shared key to the first external electronic device 400.

According to various embodiments of the disclosure, the information related to the shared key may include information indicating that the shared key is generated based on the authentication key.

According to various embodiments of the disclosure, the operating method of the electronic device 300 may further include receiving information related to the applet for managing the shared key, which is installed in the security module (e.g., the security module 430 in FIG. 4) of the first external electronic device 400 and determining whether or not to transmit the shared key to the first external electronic device 400, based on the received information related to the applet.

According to various embodiments of the disclosure, the authentication key may be one of either a master key or a key generated based on the master key, and the operating method of the electronic device may further include, if the authentication key is the key generated based on the master key, generating a token indicating that the shared key is generated based on the authentication key and transmitting the token and information related to the shared key to the first external electronic device 400.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a processor;
    at least one communication module configured to support wireless communication; and
    a security module having an applet installed therein so as to store and manage a shared key to be transmitted to a first external electronic device and an authentication key used in authentication with a second external electronic device,
    wherein the processor is configured to:
        receive a request for transmitting the authentication key to the first external electronic device;
        transmit information for generating the shared key and a command to generate the shared key to the security module;
        control the security module so as to generate the shared key, based on the authentication key and the information for generating the shared key; and
        control the security module so as to transmit the generated shared key and information related to the generated shared key to the first external electronic device,
    wherein the information related to the shared key comprises information indicating an instruction to activate at least some of functions provided by the second external electronic device,
    wherein the security module is configured to:
        if there is a plurality of applets installed in the security module, deactivate remaining applets after excluding applets for managing the shared key from the plurality of applets, and,
        in response to completion of installation of the shared key, activate the remaining applets.

2. The electronic device of claim 1, wherein the information related to the shared key comprises information indicating generation based on the authentication key.

3. The electronic device of claim 1, wherein the information for generating the shared key, which is input, comprises an available usage time of the second external electronic device and geofencing limitation data of the second external electronic device.

4. The electronic device of claim 1, wherein the processor is configured to transmit, to the security module, an encryption key for encryption of the shared key along with the information for generating the shared key.

5. The electronic device of claim 1, wherein the security module is configured to:
    receive information related to the applet for managing the shared key, which is installed in the security module of the first external electronic device; and
    determine whether or not to transmit the shared key to the first external electronic device, based on the received information related to the applet.

6. The electronic device of claim 5, wherein the security module is configured to:
    identify whether or not an applet identification included in the information related to the applet is the same as an identifier corresponding to the shared key; and
    determine whether or not to transmit the shared key to the first external electronic device, based on whether or not the applet identification is the same as the identifier corresponding to the shared key.

7. The electronic device of claim 5, wherein the information related to the applet comprises at least one of an address at which the applet is stored, an applet identification, a model identifier of the first external electronic device, data indicating whether or not to activate the applet, a priority assigned to each applet, or applet-specific data.

8. The electronic device of claim 1, wherein the authentication key is one of either a master key or a key generated based on the master key, and
    wherein if the authentication key is the key generated based on the master key, the security module is configured to generate a token indicating that the shared key is generated based on the authentication key and transmit the token and information related to the shared key to the first external electronic device.

9. The electronic device of claim 1, wherein the electronic device is configured to transmit the shared key and the information related to the shared key to the first external electronic device using the communication module.

10. An electronic device that receives a shared key from a first external electronic device, the electronic device comprising:
    a processor;
    at least one communication module configured to support wireless communication; and
    a security module configured to manage information related to an applet that manages an authentication key used in authentication of a second external electronic device and store an applet identification (AID) list and the applet, wherein the security module is configured to:
receive a signal requesting the information related to the applet from the first external electronic device;
transmit the information related to the applet to the first external electronic device;
receive the shared key and information related to the shared key from the first external electronic device, wherein the shared key is generated by the first external electronic device based on the authentication key;
if there is a plurality of applets installed in the security module, deactivate remaining applets after excluding applets for managing the shared key from the plurality of applets;
install the received shared key and the information related to the shared key in the security module; and
in response to completion of installation of the shared key, if there is the plurality of applets installed in the security module, activate the remaining applets,
wherein the information related to the shared key comprises information indicating an instruction to activate at least some of functions provided by the second external electronic device.

11. The electronic device of claim 10, wherein the processor is configure d to:
receive information on a vehicle from the first external electronic device;
identify an applet identification for management of the shared key, based on the information on the vehicle; and
transmit a command to install the applet to the security module.

12. The electronic device of claim 10, wherein the information related to the shared key is stored in the first external electronic device and comprises information indicating generation based on an authentication key used in authentication of the second external electronic device.

13. An electronic device comprising:
a processor;
at least one communication module configured to support wireless communication; and
a security module having an applet installed therein so as to store and manage a shared key to be transmitted to a first external electronic device and an authentication key used in authentication with a second external electronic device,
wherein the processor is configured to:
receive a request for transmitting the authentication key to the first external electronic device;
transmit information for generating the shared key and a command to generate the shared key to the security module;
control the security module so as to generate the shared key, based on the authentication key and the information for generating the shared key; and
control the security module so as to transmit the generated shared key and information related to the generated shared key to the first external electronic device,
wherein the information related to the shared key comprises information indicating an instruction to activate at least some of functions provided by the second external electronic device,
wherein the security module comprises a proximity vehicle key system environment (PVKSE) configured to manage information related to the applet, and
wherein the PVKSE is stored in an issued security domain of the security module, and the applet is stored in a supplementary security domain.

14. An electronic device that receives a shared key from a first external electronic device, the electronic device comprising:
a processor;
at least one communication module configured to support wireless communication; and
a security module configured to manage information related to an applet that manages an authentication key used in authentication of a second external electronic device and store an applet identification (AID) list and the applet,
wherein the security module is configured to:
receive a signal requesting the information related to the applet from the first external electronic device;
transmit the information related to the applet to the first external electronic device;
receive the shared key and information related to the shared key from the first external electronic device, wherein the shared key is generated by the first external electronic device based on the authentication key; and
install the received shared key and the information related to the shared key in the security module,
wherein the security module comprises a proximity vehicle key system environment (PVKSE) configured to manage information related to the applet, and
wherein the PVKSE is stored in an issued security domain of the security module, and the applet is stored in a supplementary security domain.

* * * * *